(12) United States Patent
Garg et al.

(10) Patent No.: US 7,689,556 B2
(45) Date of Patent: Mar. 30, 2010

(54) CONTENT NAVIGATION SERVICE

(75) Inventors: Shishir Garg, Mountain View, CA (US); Amit Goswami, Millbrae, CA (US)

(73) Assignee: France Telecom, Paris (FR)

( * ) Notice: Subject to any disclaimer, the term of this patent is extended or adjusted under 35 U.S.C. 154(b) by 346 days.

(21) Appl. No.: 11/045,115

(22) Filed: Jan. 31, 2005

(65) Prior Publication Data

US 2006/0173838 A1 Aug. 3, 2006

(51) Int. Cl.
G06F 17/30 (2006.01)
G07F 1/00 (2006.01)
G06F 7/00 (2006.01)
(52) U.S. Cl. .................................. 707/5; 705/10; 707/6
(58) Field of Classification Search ........................ None
See application file for complete search history.

(56) References Cited

U.S. PATENT DOCUMENTS

| | | | | |
|---|---|---|---|---|
| 6,185,558 | B1 * | 2/2001 | Bowman et al. | 707/5 |
| 6,606,619 | B2 * | 8/2003 | Ortega et al. | 707/2 |
| 6,616,047 | B2 * | 9/2003 | Catan | 235/472.02 |
| 6,772,150 | B1 * | 8/2004 | Whitman et al. | 707/6 |
| 6,801,917 | B2 * | 10/2004 | Gutta et al. | 707/102 |
| 6,917,922 | B1 * | 7/2005 | Bezos et al. | 705/27 |
| 6,963,867 | B2 * | 11/2005 | Ford et al. | 707/3 |
| 7,003,515 | B1 * | 2/2006 | Glaser et al. | 707/5 |
| 7,072,846 | B1 * | 7/2006 | Robinson | 705/10 |
| 2003/0172374 | A1 * | 9/2003 | Vinson et al. | 725/9 |
| 2004/0236736 | A1 * | 11/2004 | Whitman et al. | 707/3 |
| 2004/0249700 | A1 * | 12/2004 | Gross | 705/10 |
| 2005/0171955 | A1 * | 8/2005 | Hull et al. | 707/10 |
| 2005/0256756 | A1 * | 11/2005 | Lam et al. | 705/10 |
| 2006/0053090 | A1 * | 3/2006 | Cotter et al. | 707/3 |
| 2006/0143068 | A1 * | 6/2006 | Calabria | 705/10 |

OTHER PUBLICATIONS

"Design of Ontology for The Internet Movie Database (IMDb)", Sasikanth Avancha, Srikanth Kallurkar, Tapan Kamdar, {savanc1, sakallu1,kamdar}@cs.umbc.edu, Semester Project, CMSC 771, Spring 2001.*

SavageBeast Technologies, Inc. Website: www.savagebeast.com, Jan. 28, 2005.

"Adding Multimedia to the Semantic Web—Building an MPEG-7 Ontology", Author: Jane Hunter, Presenter: Kang Zheng and Yang Yang, unknown website, unknown date.

* cited by examiner

*Primary Examiner*—Charles Rones
*Assistant Examiner*—Harold A Hotelling
(74) *Attorney, Agent, or Firm*—Oblon, Spivak, McClelland, Maier & Neustadt, L.L.P.

(57) ABSTRACT

A system, method, and computer program product for presenting items within a list of items based on an individual user profile, a social network of friends of the user or a mood of the user. The system generates the individual profile of the user, determines passive friends of the user from the social network of the user and also determines the mood of the user. The user has a choice to receive an ordered list of items based on the individual user profile, the social network or the mood of the user.

4 Claims, 29 Drawing Sheets

CONTENT NAVIGATION SERVICE

BACKGROUND OF THE INVENTION

1. Field of the Invention

The present invention relates to a method, system, and computer program for analyzing, organizing and ordering items within a list based on a user's profile, friends' preferences or user's mood. More specifically, the method, system, and computer program provide a personalized list of items (movies, songs, books, or other content) for the user based on specific characteristics of that user.

2. Discussion of the Background

Consumers receive information about various products (for example movies, songs, books, games, stock, insurance, interest rates, etc.) from multiple sources and that information has become so vast with today's capabilities of receiving information (email, instant messaging, mobile phone, internet, content on demand, cable TV, etc.) that a consumer is not able to browse all that information to make an informed decision about purchasing the desired products. More specifically, a user is faced today, for example, with the task of selecting a movie from a database of movies that includes over 5,000 artists, 2,000 directors, and over 100 genres. That task is almost impossible especially when the user has to take into account the preferred artist, director, and genre. In addition to this vast array of information, the mood of the consumer and the circle of friends of the consumer also contribute to the making of the informed decision about buying the products.

However, there is no content service available that takes into consideration specific criteria used by a particular consumer/user when purchasing a product. None of the existing content services integrate all those criteria and recommend the products of a certain class (for example movies) to the consumer such that the products are ranked according to the importance to the consumer based on the above noted criteria (all the information available on the market, the preferences of the circle of friends of the user, and the mood of the user).

Recommendation services or content on demand services recommend items (usually movies and/or songs) based on a database of know preferences of a majority of consumers. Thus, these services ignore the specifics of a particular consumer and its mood. In other words, the available services create an average consumer profile and recommend to all users the same products irrespective of the user's particulars.

As the digital TV infrastructure is developing worldwide, the content on demand offer is increasing. For example, in the United States, Comcast has over 2,000 hours of content available on demand for premium customers. It is estimated that by 2008 the content services as MovieLink, CinemaNow, Music Match, Soapcity, etc, would have over 20,000 movies and over 3 million music tracks available for on-demand applications. Also, because Set Top Boxes are increasingly becoming intelligent, it is estimated that by 2008 more than 40 million users only in the United States will have advanced Set Top Boxes in their home and therefore, able to navigate and select media content from the available content on demand services.

However, the content on demand available services are confronted with the vast information discussed above, the lack of user specific information, and the failure to provide content tailored for a specific user. The conventional technique commonly used by the content on demand services for selecting and recommending movies are identifying items which are similar to items that are known to be of interest to the majority of the users. For example, based on surveys that include the opinions of thousands of users, a common pattern (majority of users like action movies) is determined and based on that common pattern the content on demand service offers to the users across the board mainly action movies.

More sophisticated services, for example a content-based website service may operate by analyzing the user's favorite web pages to generate a profile of commonly-occurring terms and then use this profile to search for other web pages that include some or all of these terms. This method takes into account some preferences of the user but those preferences are limited because the method does not differentiate, for example, a movie directly selected by the consumer by its title or by its leading artist. In other words, the above described method does not categorize the artists preferred by the user and does not distinguish between a $3^{rd}$ preferred artist and a $4^{th}$ preferred artist when recommending a movie to the user.

Existing content-based recommendation systems have other significant limitations. For example, content-based methods generally do not provide any mechanism for evaluating the quality of popularity of a product. In addition, content-based methods generally require that products/items that are searched by searching engines include some form of content that is amenable to features extraction. Thus, content-based systems tend to be poorly suited for recommending movies, music titles, etc. or other items that have little or no useful content.

Another system that is capable of producing some content recommendations is the Interactive Program Guide (IPG), which is becoming the entertainment portal for TV viewers. In-stat/MDR, a leading provider of actionable research, assessments and market forecasts of semiconductor and advanced communications equipment and services, expects the worldwide IPG market value to grow to nearly $1 Billion by 2008. IPGs will help end-users to find a TV program, movie, or sporting event from among listings of thousands of available options, and then make it easy for the users to select the program for viewing, tag it with a reminder for later, or even set up a recording to capture the show for time-shifting on a Personal Video Recorder.

However, the problem of the existing content on demand and IPG systems is that the content to be organized and presented to the user is vast and very diversified such that various categories are not related to each other. Thus, the existing systems take into consideration only those categories that can be related to each other and not all the categories available. For example, known systems take into the consideration the purchase history of the user regarding certain items or certain reviewers' recommendations about those items but not the preferences of the user's friends and the mood of the user.

Further, none of today's content navigation systems takes into consideration multiple factors that can influence the user's choice about content, as for example, in the case that the user is looking for a movie, the artist, director, basic description, rating, box office results, genre, band, producer and other factors that can play a role in influencing the user's choice about the movie. In other words, none of today's content navigation systems cater to such a low level breakdown of content to perform personalization for the individual user.

Furthermore, none of today's content navigation system takes into consideration the opinions of friends, colleagues, family members, or related persons to the user regarding the user's choice of content. Thus, the social effect on the user when deciding about the content to be purchased is not a factor considered by the available content navigation systems.

Another problem of the available content navigation systems is that the mood of the user just prior to receiving or selecting the item is not known and not taken into consideration. Therefore, even if the user likes a certain item, the mood of the user before purchasing that item can be such that is not compatible with that item. For example, if the user typically likes dramas, other conditions, e.g., a promotion at work or a death in the family, may make it inappropriate to suggest a drama at the current time. Because the available content navigation systems are not capable of factoring in the user's mood, the system would still recommend a drama movie to the user. Therefore, the conventional content navigation systems do not account for the existing mood of the user at the time of purchasing.

The conceptual model of the background art content systems discussed above is schematically illustrated in FIG. 1. FIG. 1 shows a user 110 that interacts with the content on demand system 120. The content on demand system 120 offers the user 110 a list of movies and the user 110 selects a preferred movie from the list based on (i) information available in the media about the movie (called meta-content) 130 that the user has read, and (ii) the information about the movies received from his friends 140. Thus, the user 110 "makes up his mind" based on the information (i) and (ii) and selects a desired movie from the list provided by the content on demand 120. Alternatively, the user 110 physically visits the store/provider 150 and purchase/rents the movie based on the above information.

It has been shown that Internet-based businesses like Amazon, DVD rental portal NetFlix, and TiVo have a revenue increase between 30% and 60% by a simple user assistance/recommendation engine as described above and which suggests certain content to the users. Traditionally, 80% of the entertainment industry's revenue comes via 20% of the content they produce. In a typical revenue share model, a content owner takes between 30 and 60% of the revenue and the remaining amount goes to the service provider. The more popular the content, the larger the content owner's revenue share. Thus, a content navigation and recommendation system that better suits each user will help the users increase the consumption of lesser known content (for the content that matches the criteria of the user).

SUMMARY OF THE INVENTION

The present invention addresses the above discussed problems by providing in one embodiment a personalized list of items to a user based on a profile of the user determined by the content navigation system while the user interacts with the system.

The above list of items can be provided by a method that includes: obtaining an individual profile of the user; calculating a weighted score for individual items of the list based on the individual profile of the user; and presenting the items of the list based on the calculated weighted scores of the individual items. These steps could be combined with any one or any combination of the following steps to provide the list of items: generating an ontology for the user and the list of items; creating a database that includes a plurality of categories of characteristics for each item from the list of items; incrementally increasing a value associated with each characteristic of the items when the user selects the characteristic; selecting a characteristic of the items by the user while the user is connected to an electronic media that contains at least one item; providing the electronic media to a personal computer, a telephone, a television set, or an electronic handheld device; assigning to each characteristic in the plurality of categories in the database an index based on the value associated with the characteristic, the index being inversely proportional to the associated value; dividing the value of a characteristic associated with an item by the assigned index of the characteristic to generate a weight of the characteristic; summing each generated weight for all the characteristics of an item to obtain the weighted score of the item; and assigning to each and all of the items the corresponding weighted score.

The above list of items can be provided by a computer systems that includes a profile generation unit configured to generate an individual profile of the user; a calculation unit configured to calculate a weighted score for individual items of the list based on the individual profile of the user; and a recommendation unit configured to present the items based on the calculated weighted scores of the individual items. The system also can include any one or any combination of the following units: an ontology unit configured to generate an ontology for the user and the list of items; a storage unit that stores a plurality of categories of characteristics for each item from the list of items; an increment unit configured to incrementally increase a value associated with each characteristic of the items when the user selects the characteristic; an electronic media provider unit configured to provide electronic media to a personal computer, a telephone, a television set, or an electronic handheld device; an index assigning unit configured to assign to each characteristic in the plurality of categories in the database an index based on the value associated with the characteristic, the index being inversely proportional to the associated value of the characteristic; a weight calculation unit configured to divide the value of a characteristic associated with an item by the assigned index of the characteristic to generate a weight of the characteristic; and a score calculation unit configured to sum each generated weight for all the characteristics of an item to obtain the weighted score of the item.

In another embodiment of the present invention, the content navigation system establishes a social network of friends of the user and offers the user a list of items ordered based on the preferences of the social network of friends.

The list of items ordered based on the social network of the friends can be provided by a method including: calculating an intimacy score for each passive friend of the user; generating a social network of passive friends of the user based on the intimacy score; calculating a score for each item from the list of items based on the social network of the user; and presenting the items of the list based on the calculated scores of the items. These steps can be combined with any one or any combination of the following steps: identifying active friends of the user; browsing electronic data directly exchanged between the user and friends of the user; retrieving a user ID for each friend of the user that has directly exchanged electronic data with the user; storing the retrieved user ID in a user profile; identifying friends of each active friend of the user to determine passive friends of the user; retrieving a user ID for each passive friend; storing the retrieved user ID for each passive friend in the user profile; creating an item database for the user and an item database for each passive friend, each database including a same plurality of categories of characteristics for each item from the list of items; incrementally increasing a value associated with each characteristic of an item (i) in the database for the user when the user selects the characteristic and (ii) in the database for the passive friend when the passive friend selects the characteristic; assigning a weight to each characteristic of an item that is proportional to the value of the characteristic; calculating an index for each characteristic of the item such that the index is a difference between the value of the characteristic for the user and the value of the characteristic for the passive friend; calculating a ratio between the weight for each characteristic of the item and the corresponding index; summing the calculated ratios for all the characteristics of an item and for all the items from the list of items to determine the intimacy factor between the user and each of the passive friends; storing in the profile of the user the social network of the passive friends as the first n passive friends of the user, wherein the n passive friends are determined based on the highest intimacy factor; rating items from the list of items by the passive friends from the social network; assigning an item index for each item from the list of items based on ontologies of the passive friends from the social network; calculating a ratio, for each passive friend from the social network of the user, between the rating and the item index corresponding to each item; and summing the calculated ratios for all the passive friends from the social network of the user to determine the score of the item. Also, the above noted list can be generated by using a computer program product storing instructions for execution on a computer system, which when executed by the computer system, causes the computer system to perform the steps noted above.

In still another embodiment of the present invention, the content navigation system records the interaction of the user with the system, determines the mood of the user at that instant and then recommends a list of items to the user ordered based on the mood of the user.

The list of items can be generated by a method that includes: determining a mood of the user; calculating a weight for each item from the list of items based on the mood of the user; and presenting the items of the list based on the calculated weights of the items. Further, the method can include any one or any combination of the following steps: recording activities of the user when interacting with a service provider of the items; extracting characteristics of the items with which the user has interacted during the activities; obtaining all the items related to the extracted characteristics; assigning a first weight to each characteristic of an item of the obtained items directly selected by the user during the activities and a second weight to each characteristic of the item of the obtained items indirectly selected by the user, wherein an item is directly selected if the user has selected a characteristic of the item from the service provider and then the user selects the item and the item is indirectly selected if the user has selected a first item, then a characteristic of the first item, and then a second item based on the characteristic of the first item; and summing the first and second weights for all the characteristics for each item to determine a weight of said each item. Also, the above noted list can be generated by using a computer program product storing instructions for execution on a computer system, which when executed by the computer system, causes the computer system to perform the steps noted above.

BRIEF DESCRIPTION OF THE DRAWINGS

These and other advantages of the invention will become more apparent and more readily appreciated from the following detailed description of the exemplary embodiments of the invention taken in conjunction with accompanying drawings, where.

DETAILED DESCRIPTION OF THE PREFERRED EMBODIMENTS

The content navigation system of the present invention is useful in analyzing and amalgamating the vast information available about specific items of a category (movies for example) and providing a user with a list of the items classified/arranged/ordered/ranked based on specific criteria of the user. The specific criteria of the user include, but are not limited to, the mood, the circle of friends and the preferences of the user. The content navigation system according to one embodiment of the present invention incorporates, if necessary, all the information publicly available about the items in a category, amalgamates that information to provide a weighted score for each item in the category, and presents a list of the most relevant items to the user for his selection based on the weighted score. The content navigation system is not limited to ordering items such as movies or music tracks, but it is applicable to items from various other categories (stock, books, etc.) for which information about the items is available. An exemplary list of categories according to the present invention includes, but is not limited to, movies, music tracks, stock shares, books, cars, electronics, purchasing products, rental products, flight booking, reservations, etc.

Figure 1:
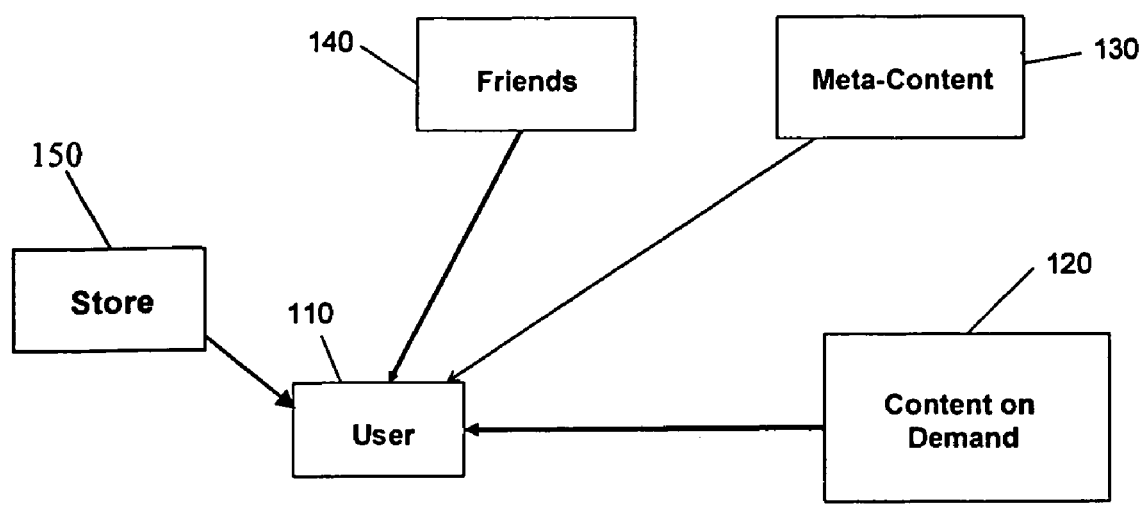
FIG. 1 is a schematical representation of a conventional conceptual model for obtaining information about a movie by a user.
Figure 2:
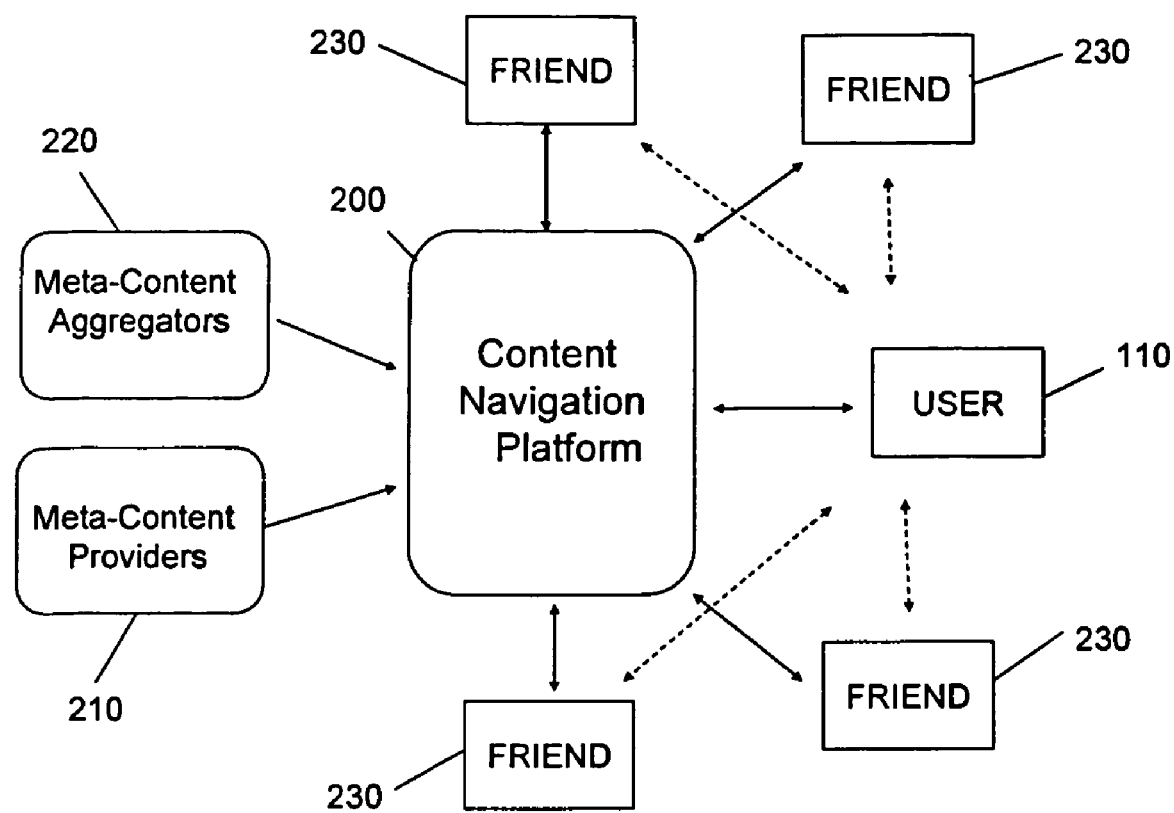
FIG. 2 is a schematical representation of a conceptual model for obtaining information about a movie by a user according to one embodiment of the present invention.

FIG. 2 illustrates an exemplary system and method of the present invention. For a better understanding, examples regarding the selection of movies from all available movies are used throughout the specification. However, the examples presented in the specification are not intended to limit the present invention. As discussed above, the content navigation system discussed herein is applicable to various categories of items.

FIG. 2 shows a content navigation platform 200 that is connected to meta-content providers 210 and to meta-content aggregators 110. The terms meta-content or meta-data refers generally to data about data. A good example of meta-data is a library catalog card, which contains data about the nature and location of the data in the book referred to by the card. Another example is a magazine or an online article that contains information about a movie. Meta-data is useful to find information from the mass of information available. In one embodiment of the present invention the meta-data is created by the system described herein. Alternatively, the meta-data is provided by the commercial providers to the content navigation system according to one embodiment of the present invention.

Further, FIG. 2 shows that the content navigation platform 200 exchanges information with friends 230 of the user 110 and the content navigation platform 200 also exchanges information with the user 110. Thus, the content navigation platform 200 obtains information from the meta-content providers 210 and also obtains aggregated information from the meta-content aggregators 110. The meta-content aggregators 200 parse the information provided by the meta-content providers 210 and aggregate that information in a specific format that is used by the content navigation platform. For example, the meta-content providers 210 provide information about movies including movie reviews, articles, interviews and news. The meta-content aggregators 220 provide detailed movie information about the movies, including artist, genre, director, synopsis, awards, box office ratings, general consensus, people's perceptions and keywords. One example of a meta-content provider is Yahoo or Reuters, and one example of a meta-content aggregator is Rotten Tomatoes.

The content navigation platform 200 also receives information about movies purchased or rented by friends 230 of the user 110. As will be explained later, the friends 230 of the user 110 have their preferences about movies and these preferences are compared with the preferences of the user 110 and then aggregated to produce a score that will be assigned to the movies seen by the friends 230. The content navigation platform 200 will then provide the user 110 with a list of movies that are listed in a specific order based on criteria set by the content navigation platform 200.

The content navigation platform 200 is also capable to obtain information from the user 110 that is relevant to the mood of the user 110. Thus, the content navigation platform 200 can provide the user 110 with a list of movies that are listed based on the mood of the user 110 at the time of purchasing the movies.

Figure 3:
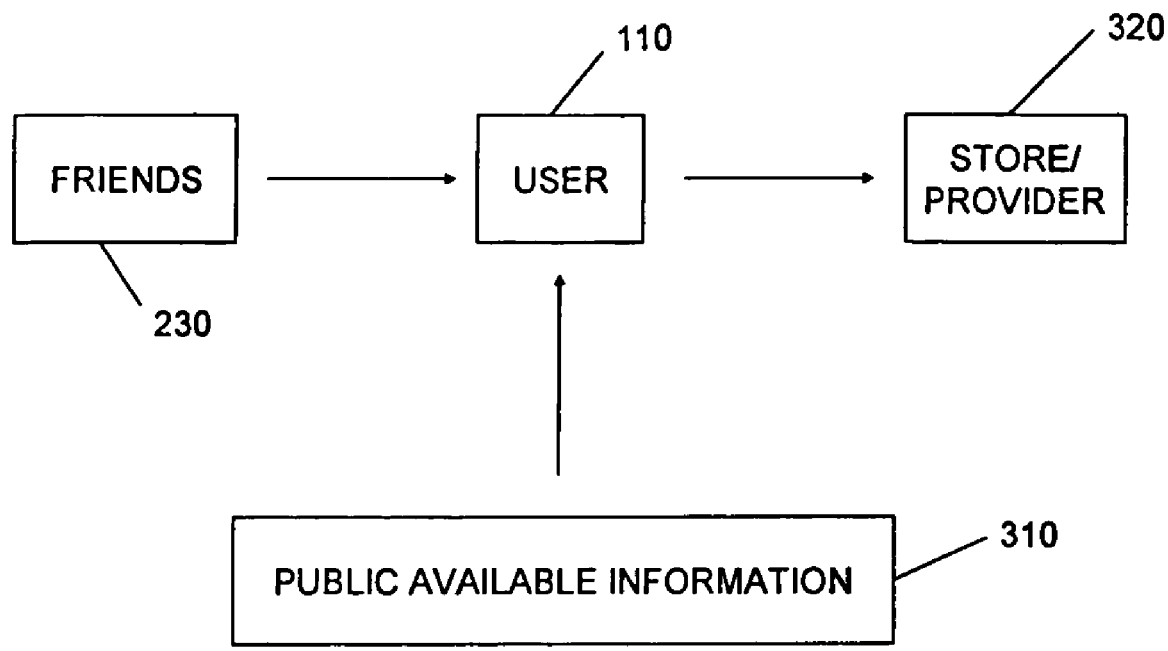
FIG. 3 is a schematical representation of a conventional method of deciding what movie to purchase/rent.

Therefore, contrary to the conventional systems illustrated in FIG. 3 (in which the user 110 instead of a system has to take into consideration the publicly available information 310, and the recommendations of the friends 230 and then the user 110 has to physically visit the movie store 320 to purchase/rent the desired movie), the content navigation system of the present embodiment selects movies based on (i) movie specific factors (e.g., from 5,000 (artists)+2,000 (directors)+100 (genres)) specified by the user's past purchase/rent history, (ii) the preferences of the friends of the user, and (iii) the mood of the user and provides the user with the movies ordered within the list.

Ontological Representation of a Personalized Movie Domain

In one embodiment of the present invention the content navigation system uses an ontological representation of the relationships among the user, the movies, and the characteristics of the movies (as artists, directors, reviewers, etc.). The ontological approach is different than the conventional approach discussed with regard to FIG. 3. The ontological representation treats the user's interaction with the content space as domain specific behavior as will be explained next. Although the ontological representation in the present embodiment is discussed regarding to selecting a movie, the same representation is applicable to any database of information that contains information about information, i.e., meta-content.

Ontology is an explicit formal specification of how to represent the object, concept, and other entities that are assumed to exist in some area of interest of the user and the relationship that holds among them. It is a specification of a conceptualization. Because an ontology defines concepts and relationships among the user and various characteristics, generating an ontology allows to discover the relationships that exist between entities, thus enabling an ontology inference layer to return deterministic responses to queries of the user.

In addition, the ontology when applied to a particular user factors in the specific characteristics/factors desired by the user and also is able to produce a high level of personalization by analyzing the content consumption behavior of each particular user.

Figure 4:
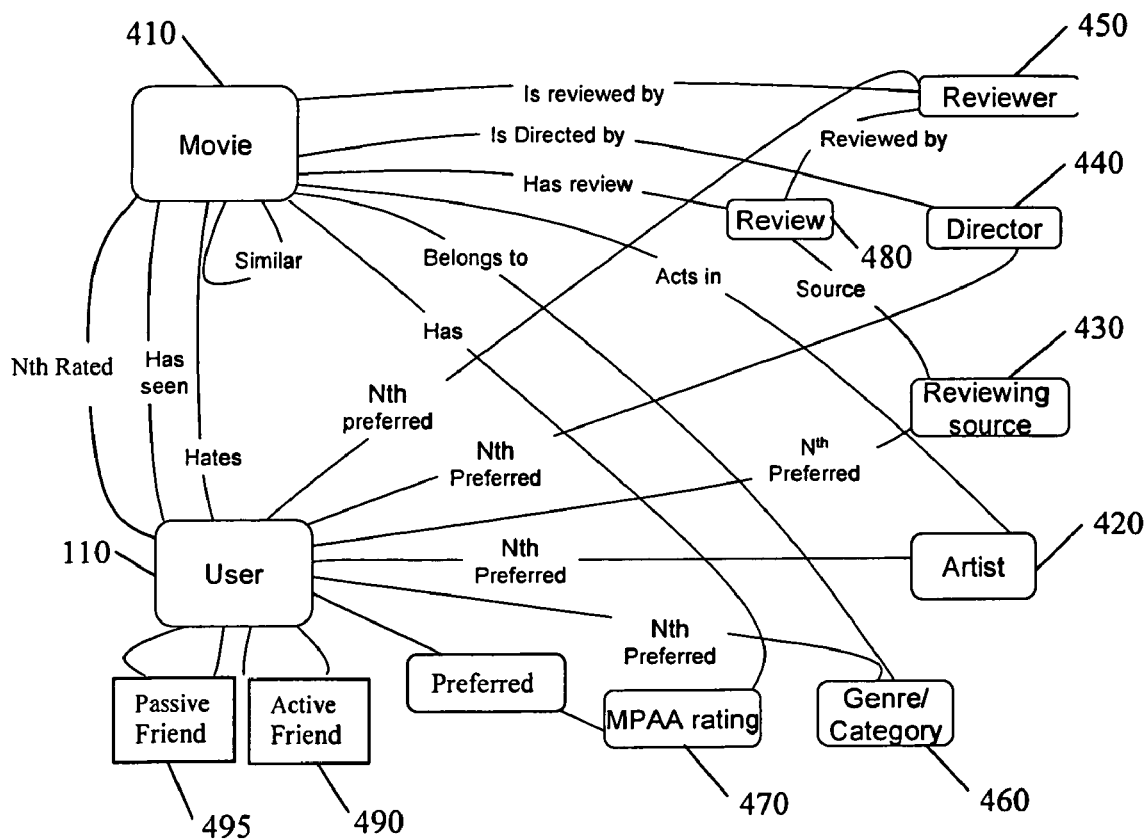
FIG. 4 is a schematical representation of a movie ontology according to one embodiment of the present invention.

In one example, FIG. 4 shows a movie ontology. The movie ontology relates two objects, the user 110 and the movie 410 and creates the relationships between the user 110 and the characteristics 420-480 of the movie 410. The movie ontology creates direct and indirect relationships between the user 110 and the movie 410. The direct relationships in this example are established when the user 110 has seen the movie 410 and the user 110 has rated the movie 410 with a number of stars from one to five or the user 110 dislikes the movie 410.

There are indirect relationships between the user 110 and the movie 410. Depending on the characteristics of the movie (artist, director, genre, rating, reviewer, reviewing source) and the characteristics that the user 110 is interested to consider when selecting the movie 410, there are various indirect relationships. FIG. 4 shows indirect relationships between the user 110 and the artist 420, the reviewing source 430, the director 440, the reviewer 450, the genre 460, the MPAA (Motion Picture Association of America) rating 470, and the review 480, all characteristics of the movie 410. In addition, further indirect relationships are created between the user 110 and movies via active friends 490 and passive friends 495.

The "direct" and "indirect" terms used above describe the way the user 110 has acquired the movie 410. If the user 110 has purchased the movie 410 directly, without reading a review about the movie or about the artist, director, etc. of the movie, then the relationship is considered direct. If the user 110 has initially received information about the artist, the director, etc, and then the user 110 has selected the movie 410 related to that artist, the relationship between the user 110 and the movie 410 is indirect.

The "Nth preferred" link between the user 110 and the artist 420 shown for example in FIG. 4 is established by the ontology and will be used later to calculate the weighted score of the movie 410. The calculation of the "Nth" order is also explained later. Each of the characteristics 430 to 460 and 480 of the movie 410 have an order that is calculated by the movie ontology.

Also, the indirect relationships between the user 110 and the movie 410 are determined by (i) the active friend 490 when this friend has recommended the movie 410 to the user 110 or (ii) the passive friend 495 when the passive friend has close interests to the user 110. The terms "active friend," "passive friend," and "close interests" are defined later.

Figure 5:
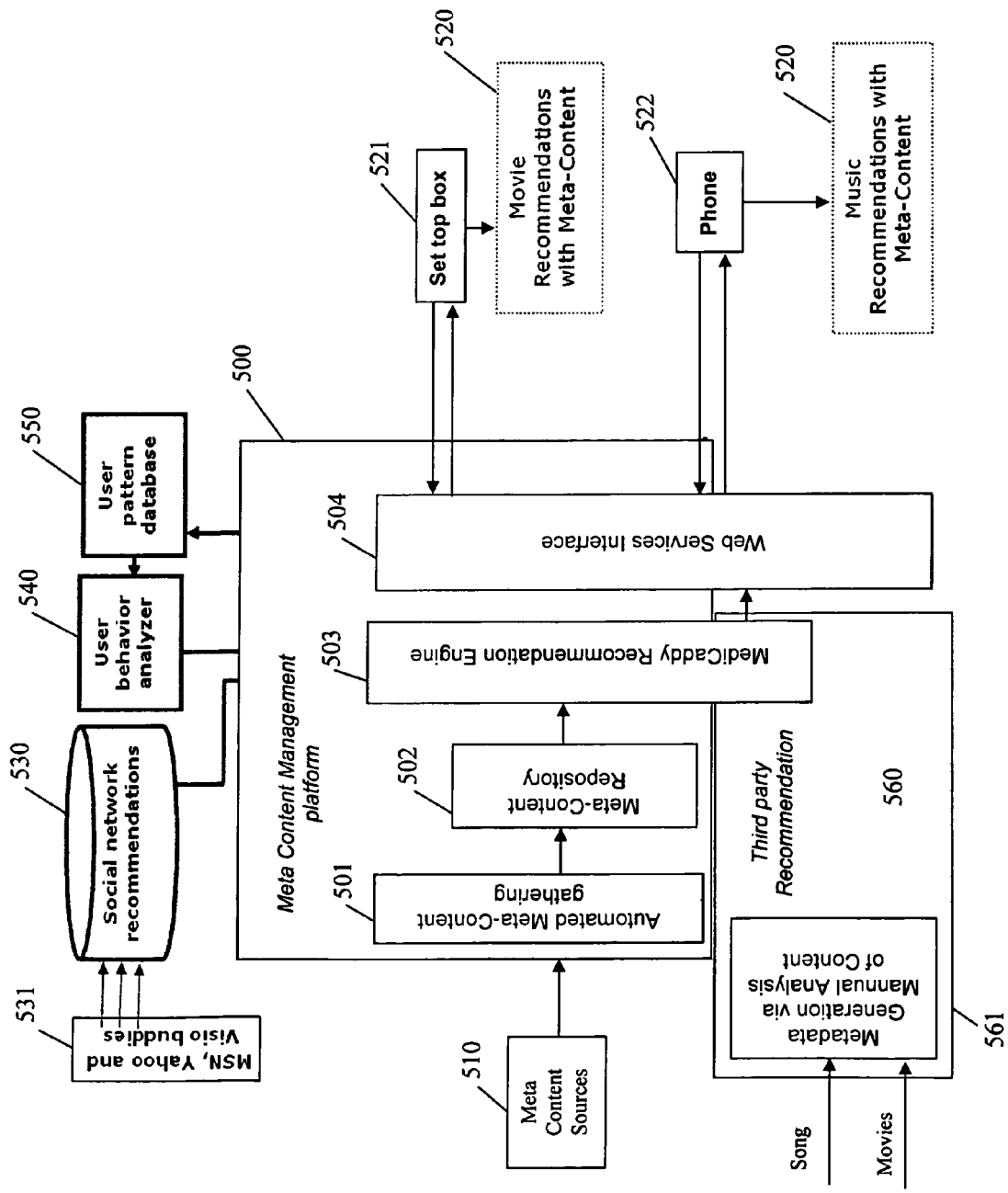
FIG. 5 is schematical representation of a platform architecture of a content navigation system according to one embodiment of the present invention.

The ontology between the user and all the movies having the characteristics desired, requested, or in which the user has shown interest during his/her usage of the content navigation system are dynamically built and information is populated in various ontological entity instances. These entity instances are integrated with the information obtained from third party engines that crawl through different web-based content information sources and extract any movie related information, as shown in FIG. 5. Such an example of a third party engine is for example RETE's algorithm described in "RETE: A Fast Algorithm for the Many Pattern/Many Object Pattern Match Problem" Charles L. Forgy, Artificial Intelligence 19 (1982), 17-37, which is incorporated herein by reference in its entirety.

FIG. 5 shows a platform architecture of the content navigation system 500 and the connections between the content navigation system 500 and various modules that acquire/distribute information. The content navigation system 500 receives information from meta-content sources 510. The meta-content sources 510 can include review articles from newspapers, entertainment magazines, etc. Also, the meta-content sources 510 can include structured meta-content aggregators as Rotten Tomatoes, Muze, or other known providers. The content navigation system 500 includes an automated meta-content gathering module 501 that automatically gathers the meta-content from the meta-content sources 510 and input that information into the ontology. Also, the content navigation system 500 includes a meta-content repository module 502 (i.e., the ontology) that stores the meta-content data received from the module 501. A media caddy recommendation engine 503 is connected to the meta-content repository module 502 and provides the list of movies/music 520 based on the characteristics important for the user 110 via a web service interface 504 and a set top box 521 or a smart phone 522.

The content navigation system 500 is connected to a social network recommendation module 530 that stores preferences of the active and passive friends of the user 110, retrieved from public instant messaging providers 531 as MSN, Yahoo, Visio, etc. In addition, the content navigation system 500 is connected to a user behavior analyzer 540 and to a user pattern database 550 to enable the content navigation system 500 to detect a mood of the user, as will be explained in greater detail later.

Further, the content navigation system 500 is connected to a third party recommendation system 560 that via a manual meta-data generation module 561 manually generates meta-data about movies, music tracks, etc. For example, third party providers as SavageBeast (a document describing the SavageBeast company as found on its web site www.savagebeast.com is incorporated by reference herein), have artists that analyze music tracks and manually generate meta-data for the music tracks after a subjective analysis.

Figure 6A:
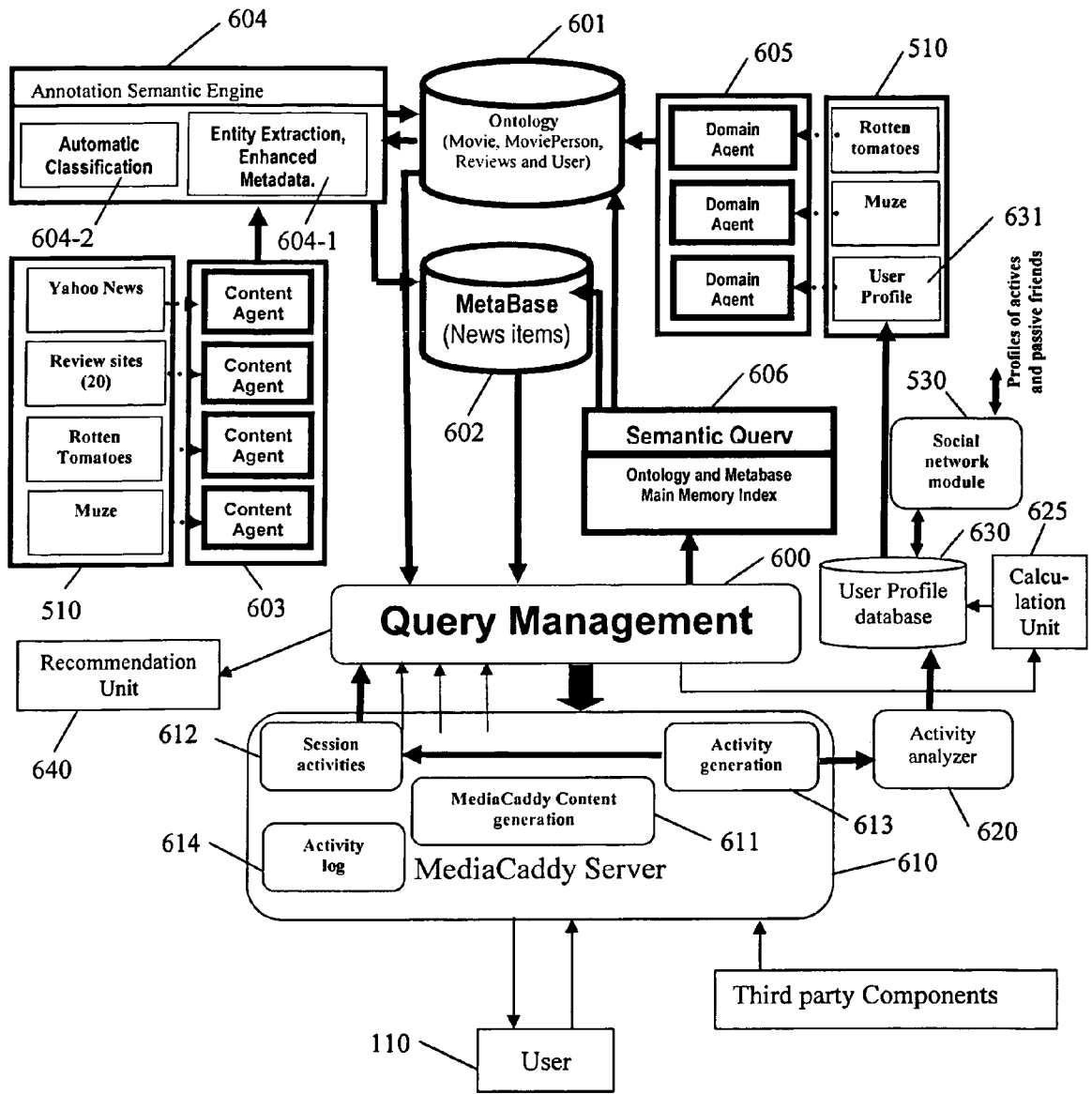
FIGS. 6A and 6B are schematical representations of the components of the content navigation system according to one embodiment of the present invention.

FIG. 6A shows a component level view of the content navigation system 500. The content navigation system 500 includes a query management module 600 that coordinates the interactions among various components of the content navigation system 500. The query management module 600 is connected to a media caddy server 610 that includes a media caddy content generation module 611, a session activity module 612, an activity generation module 613, and an activity log module 614. The activity log module 614 stores the information associated with the log in process of the user into the content navigation system 500. For example, the activity log module 614 records a log in time, a log out time, and the duration of the session of the user. The activity generation module 613 generates lists of the user's interests during a login session, for example the name of the artists, the name of directors, the name of the movies, the name of the reviewers of the movies, the name of the review sources, etc., selected by the user during the current session. The activity session module 612 collects information from the user 110 regarding any interaction of the user with the content navigation system 500, as for example the content of the web pages visited by the user, the device used by the user to visit those web pages, the amount of time spent by the user on each page, etc. The media caddy content generation 611 generates the content to be offered to the user 110 based on information received from the query management 600.

The media caddy server 610 is connected to an activity analyzer module 620 that analyzes the activity of the user 110 when connected to the content navigation system 500. The activity of the user is related to logging into the content navigation system and searching for any product or exchanging data with friends. The activity analyzer module 620 is connected to the user profile database 630, in which the user's patterns of behavior detected by the module 620 are stored. The user profile database 630 is updated periodically with new information by the activity analyzer module 620, which acts as a profile generation module in conjunction with the query management module 600. The user profile database 630 also exchanges information with the social network module 530 described above and with the user profile 631. The content navigation system 500 generates an individual user profile 631 for each user by taking into account preferences of the user and the user interaction with the social network. The user profile data base is also used to dynamically update the user's relationships with the movies and their characteristics.

Figure 6B:
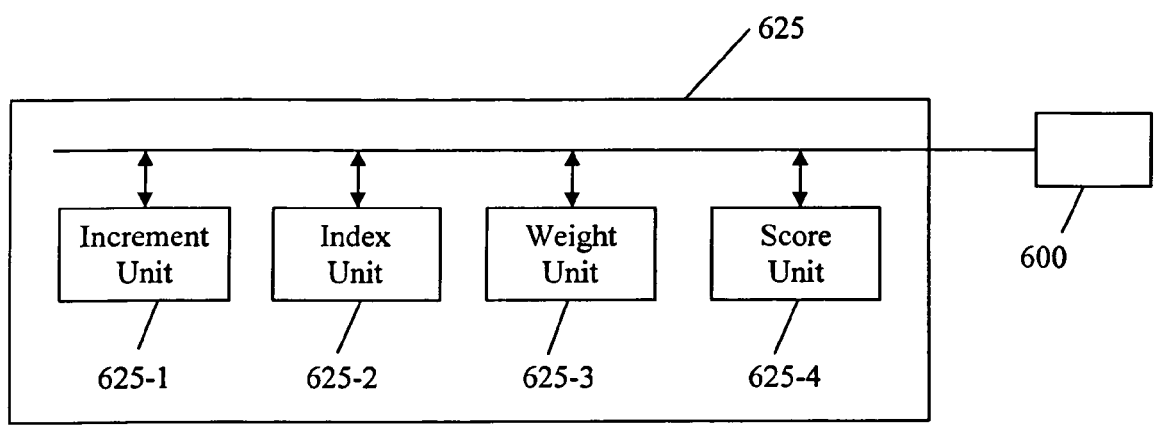

A calculation module 625 is connected to the user profile database 630, or to the ontology 601, and to the query management module 600. Alternatively, the calculation module 625 is part of the management module 600. The calculation module 625 is shown in FIG. 6B in more details as having an index unit 625-1 that assigns an index to each characteristic (i.e., artist, director, etc.) of the movies. The index is inverse proportional to a value corresponding to the characteristic, as will be discussed later. The calculation module 625 includes a weight calculation module 625-2 that calculates a weight of each characteristic by dividing the index of the characteristic with the value of the characteristic. The calculation module 625 can include a score unit 625-3 that calculates a weighted score of a movie by summing each weight of the characteristics of the movie. Also, the calculation module 625 can include an increment unit 625-4 that increments the value associated with each characteristic of the movies when the user selects the characteristic.

The query management 600 is also connected to the ontology 601 and to the meta-base module 602. Thus, the query management module 600 is capable to retrieve information about (i) movies, their characteristics, and preferences of the user from the ontology 601, and (ii) news items related to the movies and their characteristics from the meta-base module 602. As discussed above with regard to FIG. 5, the ontology 601 includes content information available from the meta-content providers 510. This content information is extracted by content agents 603 and then enhanced by an annotation semantic engine module 604. The annotation semantic engine could be a third party component which browses meta-content providers as Yahoo and identifies the movies listed by the providers, the artists and any other characteristics of the movies. The meta-base 602 also receives content information from the meta-content providers 510 via the semantic enhancement module 604.

Further, the ontology 601 receives knowledge information from the meta-content providers 510 via a domain agent 605. The domain agent 605 gathers facts about the movies from the meta-content providers and input that information to the ontology 601 to establish the relationships between the user and the movies.

A semantic query module 606 is connected to each of the ontology 601, the meta-base 602, and the query management module 600 and acts as a main memory index. The semantic query module 606 is capable to search the meta-base 602 and to provide for example a list of all the movies which have in common a certain actor. The query management module 600 queries the semantic query module 606 about movies and their characteristics and the semantic query module 606 connects to the ontology 601 and the meta-base 602 for providing to the query management module 600 the corresponding answers to the queries of the query management module 600.

A recommendation module 640 retrieves the movies ordered by the query management module 600 and presents that information to the user via a screen or any other display method known in the art.

Figure 7:
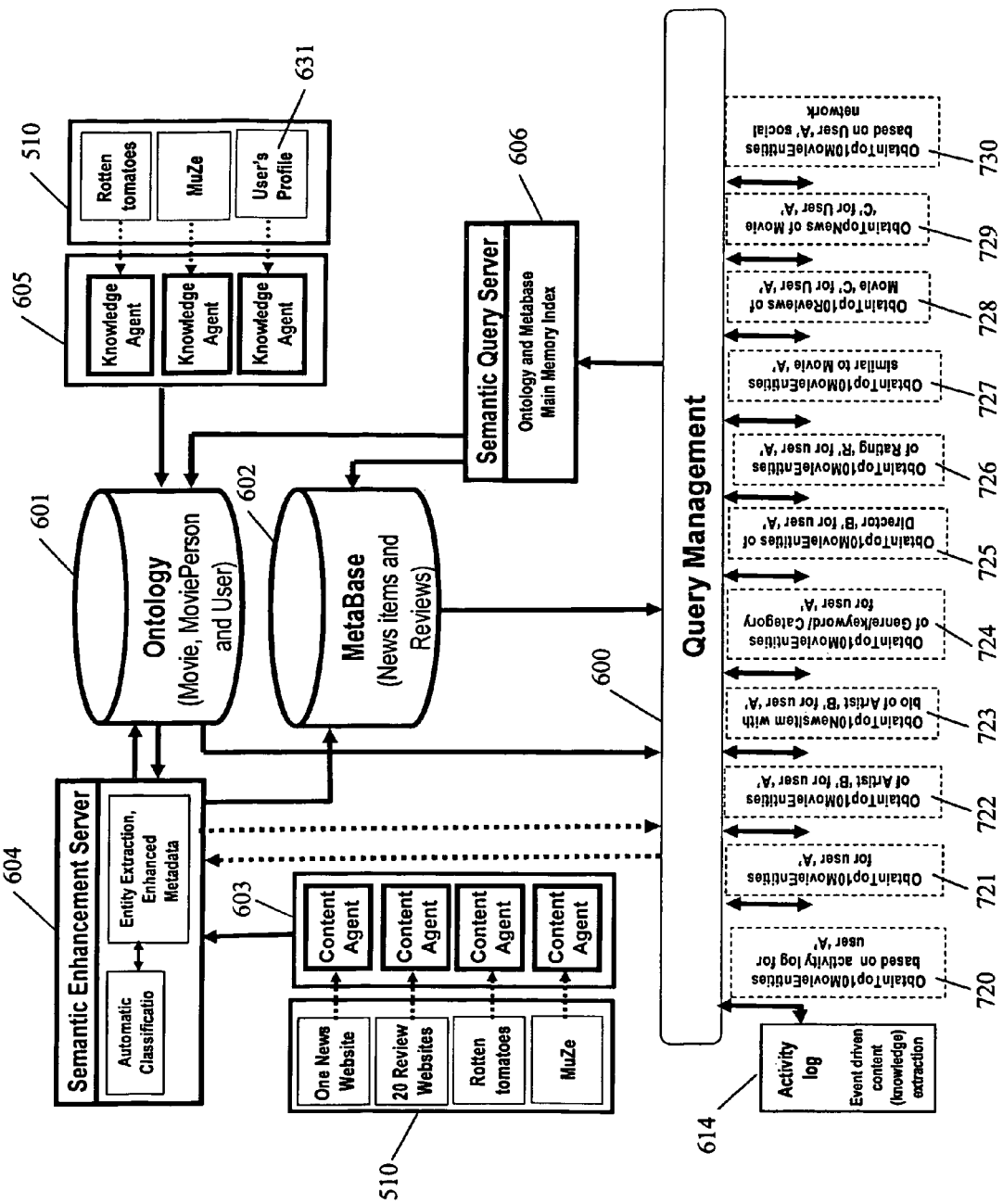
FIG. 7 is a schematical representation of the management of the content navigation system described in FIGS. 5 and 6A-B according to one embodiment of the present invention.

FIG. 7 illustrates the management of the content navigation system 500. In more details, the activity log module 614 provides the log in/out information of the user 110 to the query management module 600. For example, if the user 110 requests a list of movies based on his mood (this process will be described later in greater details), the query management module 600 analyzes the information provided by the activity log 614 and determines the mood of the user 110. Based on that information and information regarding the movies that is stored in the meta-base 602, the query management module 600 ranks the movies and provides the user 110 with a list 720 that includes, for example, the top ten movies based on the mood of the user 110. The number of movies provided in the list is a setting of the content navigation system 500 and can be modified by the user 110.

Alternatively, the query management module 600 can provide in one embodiment a list 721 of 10 movies for the user 110 based on the user profile 631. In addition, the query management module 600 could provide extra information (movies, actors, directors, reviews, etc.) related to the movies selected by the user 110, as for example: a list 722 of the movies in which actor B (actor B acts in one movie selected in list 721) also acts; a list 724 of movies selected by genre; a list 725 of movies selected by the director; etc.

Further, the query management module 600 offers another criterion for selecting the movies to be offered to the user 110. The query management module 600 can select in one embodiment the movies to be recommended on a list 730 by taking into consideration the preferences of the user's circle of friends (this method will be explained later in greater details).

Figure 8:
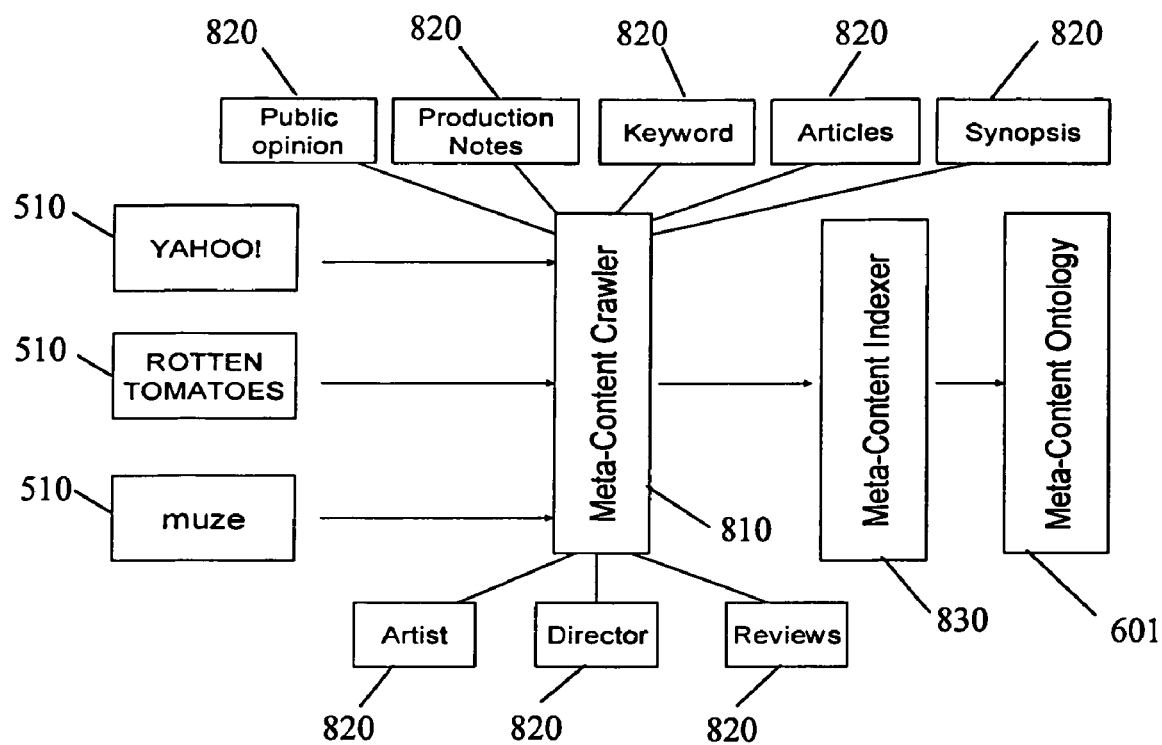
FIG. 8 is a schematical representation for obtaining content information and knowledge information according to one embodiment of the present invention.

The content information and the knowledge information captured by the content agent 603 and the knowledge agent 605 shown in FIG. 7 are discussed with regard to FIG. 8. FIG. 8 shows various meta-content providers 510 that are parsed by a meta-content crawler module 810 for extracting information regarding the movies and their characteristics. The meta-content crawler module 810 is either part of the content navigation system 500 or is a third party service that provides the information to the content navigation system 500. The meta-content crawler module 810 extracts any movie related information.

The content information refers to the information that is used to classify each piece of information extracted by the crawler module 810, and includes artists, directors, reviews, box office data, etc. (820 in FIG. 8). The information that is associated with an artist for example is knowledge information. The content information is used by the query management module 600 to classify and index the information and the knowledge information is presented to the user when the user requires specific information about an artist, director, etc of a movie.

The information generated by the meta-content crawler module 810 is indexed by a meta-content indexer 830 and then provided to the ontology 601 for establishing the direct and indirect relationships between the user and the movies, as discussed above with reference to FIG. 4.

The content navigation system 500 uses beside the content and knowledge information and the information provided by the ontology as illustrated in FIG. 4, user specific information that defines the user profile 631. The content navigation system 500 uses the specific information from the user profile 631 when the user requires a list of movies based on his preferences. The content navigation system 500 does not use the specific information when the user requires a list of movies based on his mood. Thus, the user profile 631 is an optional module for the content navigation system 500.

The information used by the content navigation system 500 to account for the mood or profile of the user is acquired though a semantic clickstream capture module that captures and analyzes the user's navigational and content selection inputs. The semantic clickstream capture module receives information from the activity session module 612, the activity generation module 613 and the activity log module 614.

The semantic clickstream capture module captures and stores the information received from the user, analysis that information and generates a semantic meta-data of the user. The semantic meta-data of the user is stored in the user profile database 630. The exchange of data between the user and the semantic clickstream capture module uses HTTP protocols, XML based protocols, or web services standard base exchanges. The semantic clickstream capture module records the activity of the user when logged in into the content navigation service 500, including browsing the web, exchanging emails with friends, exchanging instant messages with friends, exchanging electronic data, etc.

Figure 9:
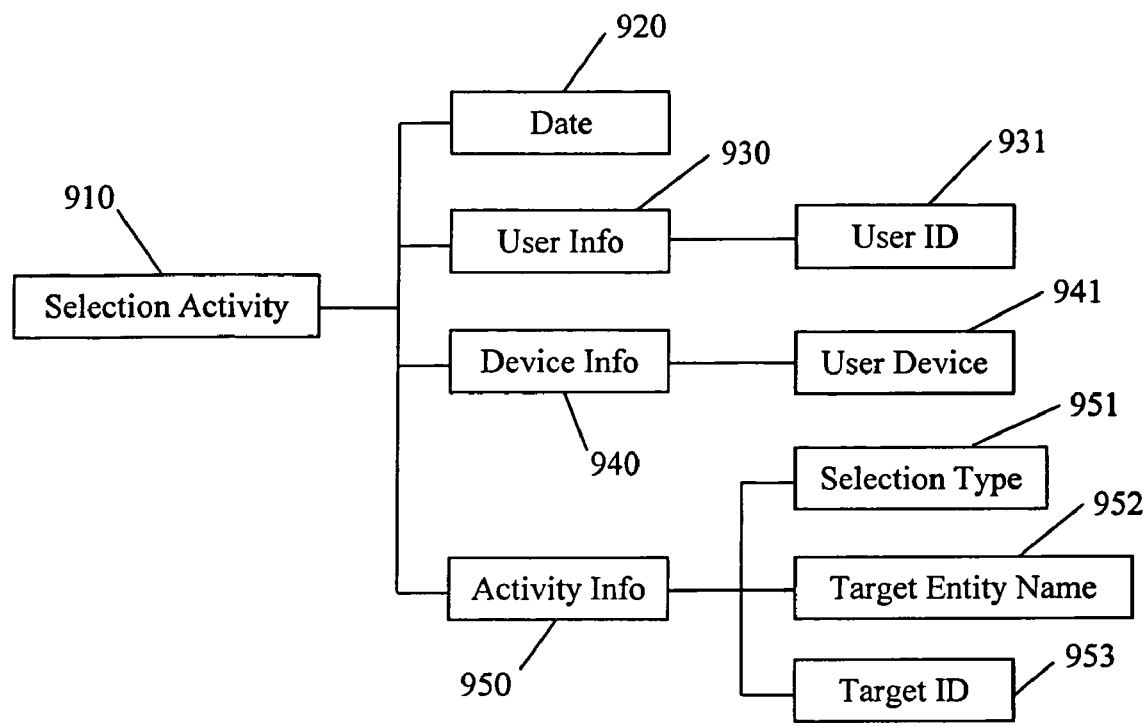
FIG. 9 is a schematical representation of the information retrieved by the content navigation system during selection activities of the user according to one embodiment of the present invention.

There are four types of activities that the semantic clickstream capture module captures and analyzes. Each of FIGS. 9-12 illustrates one of the four types of activities. FIG. 9 shows the selection activity module 910. The selection activity module 910 retrieves information related to the selection of a specific target (web page, movie, artist, etc.). This information includes a date 920 of when the activity takes place, an identification 930 of the user, the ID 931 assigned to the user by the content navigation system 500, the device information 940 that identifies the device used by the user to log in into the content navigation system 500, and activity information 950 related to the activity performed by the user while logged in into the content navigation system 500. The activity information could include the type of activity 951 selected by the user (movies, songs, etc.), the target name 952 of the source used by the user to obtain the information, and a target ID 953 assigned by the content navigation system to the target browsed by the user.

Figure 10:
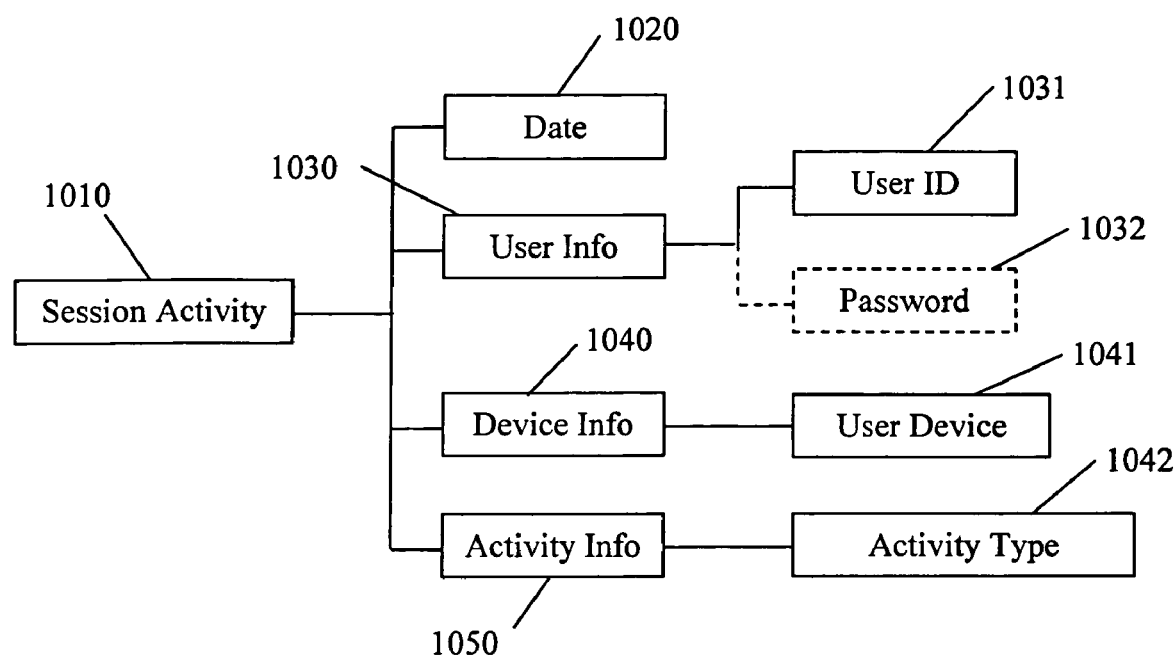
FIG. 10 is a schematical representation of the information retrieved by the content navigation system during session activities of the user according to one embodiment of the present invention.
Figure 11:
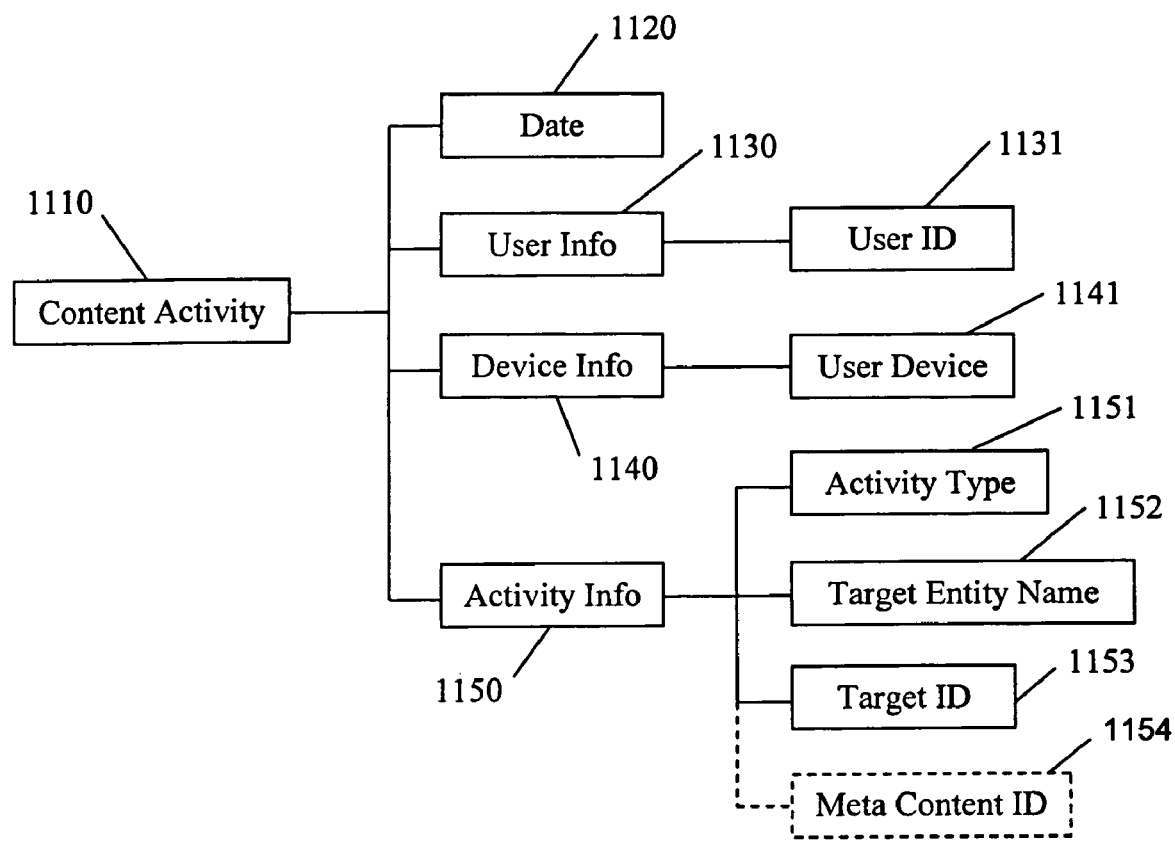
FIG. 11 is a schematical representation of the information retrieved by the content navigation system during content activities of the user according to one embodiment of the present invention.
Figure 12:
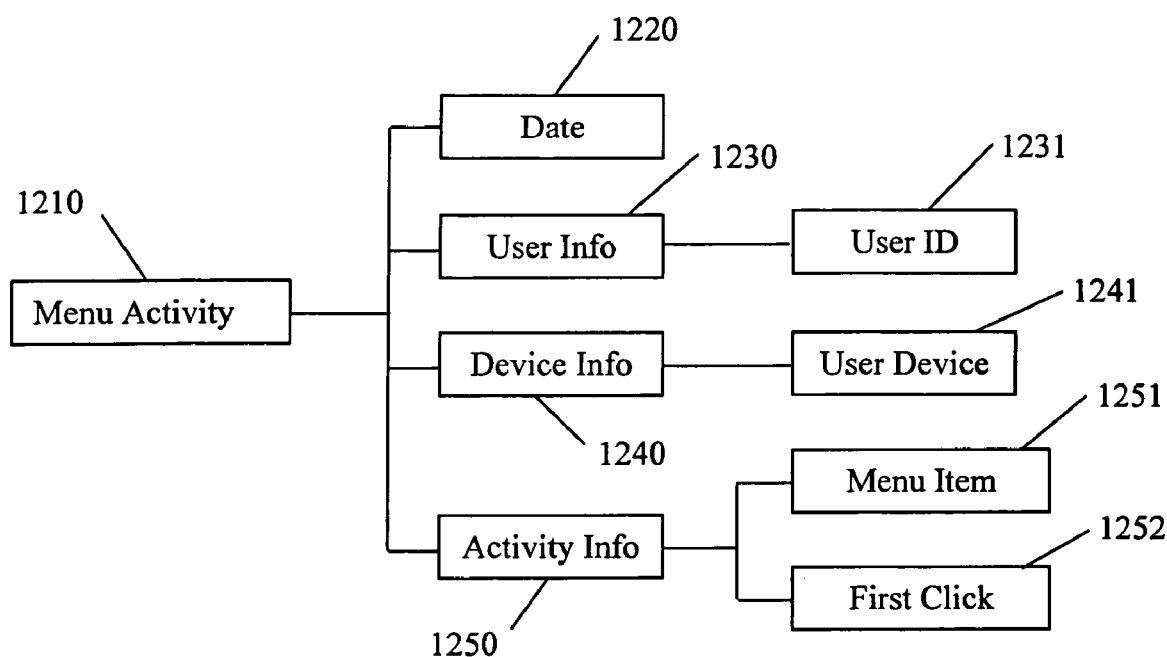
FIG. 12 is a schematical representation of the information retrieved by the content navigation system during menu activities of the user according to one embodiment of the present invention.

FIGS. 10-12 show corresponding schematical illustrations for the session activity 1010, the content activity 1110, and the menu activity 1210 modules. The session activity module 1010 retrieves information about the time the user has logged in into a session, the logout time, the web sites visited, time durations for each web sites, etc. The content activity module 1110 retrieves information about the content (meta-content) of the information domain (Yahoo) visited by the user. The menu content module 1210 retrieves information about the menu used by the user while navigating the content navigation system 500. As will be discussed later, the content navigation system 500 can be a software package that interacts with the user and allows the user to navigate in various domains to obtain information about the movies for example. In another embodiment, the content navigation system 500 can be a dedicated hardware that is programmed to provide the above discussed information to the user. The content navigation system 500 is in one embodiment a web-based platform to which the user connects via a computer, mobile phone, PDA, etc.

The information collected by the selection activity, the session activity, the content activity, and the menu activity modules is stored by the semantic clickstream capture module and then analyzed and integrated into the ontology if necessary, or used to created the user profile, or used by the query management module 600 to generate the list of movies based on the mood of the user.

Figure 13:
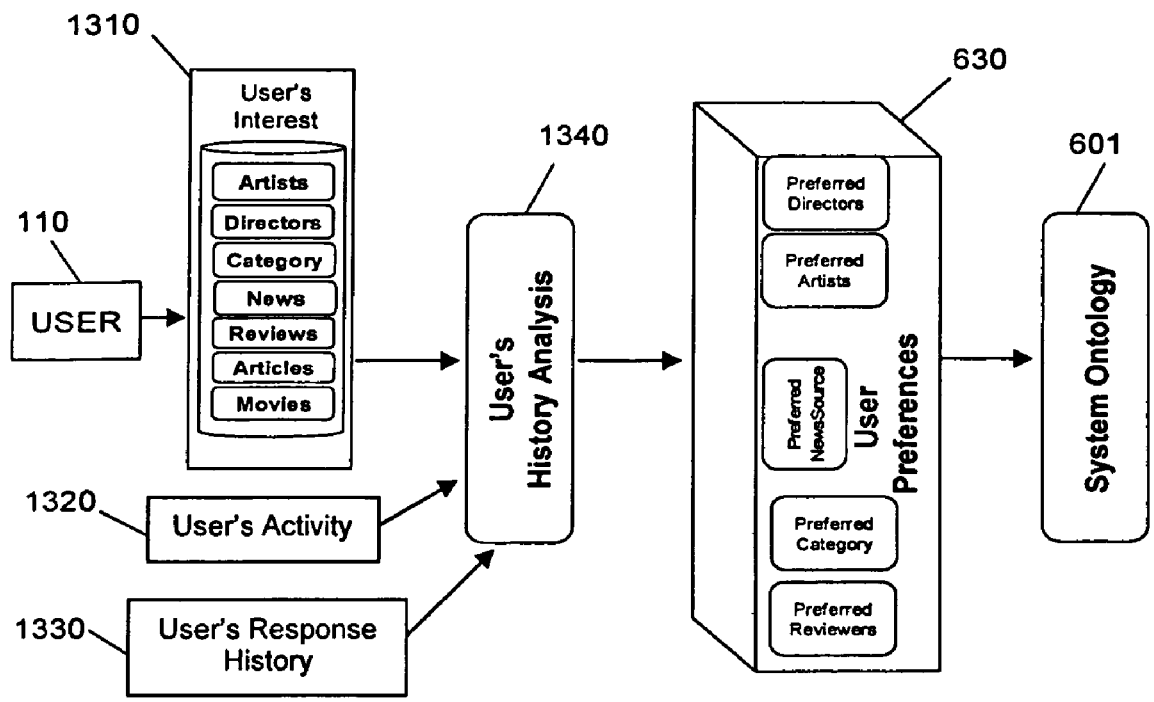
FIG. 13 is a schematical representation of the determination of the user's profile based on the activities of the user according to one embodiment of the present invention.
Figure 14:
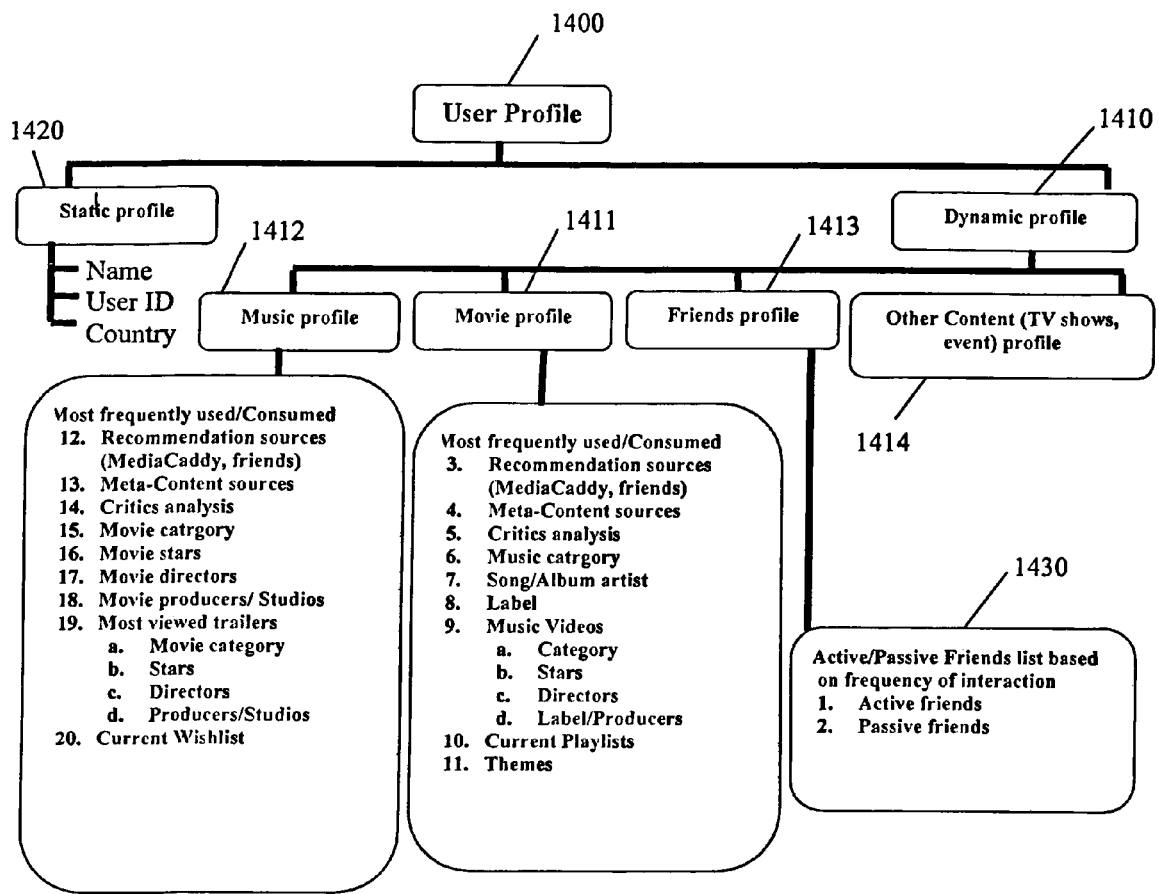
FIG. 14 is a schematical representation of the user profile according to one embodiment of the present invention.

The generation of the user profile is schematically described with regard to FIG. 13. FIG. 13 shows only the generation of the movie part of the user profile. For example, the user profile may include a song component or other components as well. A more complete user profile 1400 is shown in FIG. 14 and includes a music profile 1412 and a friend profile 1413 beside the movie profile 1411. The user profile 1400 has a dynamic part 1410 that is updated constantly, and a static part 1420 that includes information specific of the user, as for example the name of the user, the user ID assigned by the content navigation system 500, and the country of the user. The movie profile 1411, the music profile 1412, and the friends profile 1413 are grouped under the dynamic part 1410 of the user profile 1400. The dynamic part 1410 can include other content profile 1414, as for example TV shows, events, etc.

FIG. 13 shows that information from the user interests module 1310, the user activity module 1320, and the user responses history module 1330 is analyzed by a user history analysis module 1340. The user interests module 1310 retrieves information about the artists, directors, categories, news, etc. preferred by the user. The user activity module 1320 retrieves information recorded by the semantic clickstream capture module as described above with regard to FIGS. 9-12. This information accumulates in time as the user is using the content navigation system 500 and other sources of information. When the user watches and rates a movie, the user might input that information into the content navigation system 500, and the user response history module 1340 receives and store that information for further usage.

The information provided by the user interests module 1310, the user activity module 1320, and the user responses history module 1330 is analyzed and structured by the user history analysis module 1340 and the structured information is stored in the user profile database 630. The information of the user profile database 630 is used by the ontology 601 to generate the direct and indirect relationships between the user and the movies and their characteristics.

The user profile database 630 is configured to generate a limited amount of information to the ontology 601. For example, the user profile database 630 supplies the ontology 601 with the top ten preferred movies, preferred artists, preferred directors, etc. The ontology 601 is updated periodically with information from the user profile database 630, depending on the settings of the content navigation system 500. However, the user profile database 630 can be configured to generate more or less information than ten preferred movies, directors, etc.

The user profile database 630 includes a corresponding entry for each and all the movies and characteristics associated with the movies, as for example directors, artists, news sources, reviewers, etc. A structure of the user profile database 630 is discussed with reference to Table 1. Table 1 shows only one characteristic of the movies stored in the user profile database 630. That characteristic is the directors and Table 1 shows only 7 directors, A to G. However, the user profile database 630 includes an entry for over 2000 of known directors. Row one of Table 1 shows the seven directors A to G and column one shows the number of sessions the user logged in into the content navigation system.

TABLE 1

| Directors/sessions | A | B | C | D | E | F | G |
|---|---|---|---|---|---|---|---|
| $1^{st}$ | 1 | 1 | 0 | 0 | 0 | 0 | 0 |
| $2^{nd}$ | 1 | 2 | 1 | 0 | 0 | 0 | 0 |

The first column of Table 1 shows that the user had two sessions in which the user connected to the content navigation system 500 to browse movies or characteristics of the movies. In the particular example illustrated in Table 1, which is not intended to limit the present invention, the user obtains information about directors A and B during the first session.

The content navigation system 500 automatically retrieves that information and populates the user profile database 630 by increasing a value corresponding to the browsed directors with a unit, in this case by one. In this example, the entries for the directors A to G were zero previous to the first session discussed above, either because the user never used before the content navigation system 500 or because the user never browsed these particular directors. The content navigation system 500 stores the values associated with each director when the user logs out of the system and also the information browsed by the user regarding these directors.

When the user logs in into the system during a second session and browses information regarding directors B and C, the content navigation system 500 retrieves the information browsed by the user regarding directors B and C and updates the user profile database 630 by incrementing the values of those directors by one. The value of the increment can be different than one. When the second session is terminated, the values corresponding to the directors A to G are as shown in row three of Table 1.

Based on the example shown in Table 1, the indirect relationships for the directors are established in the ontology 601. Because director B has a corresponding value of two, the highest value for the directors, director B is the $1^{st}$ preferred director for the user for which this database was generated. Directors A and C would be the $2^{nd}$ preferred directors and the remaining of the directors would be the $3^{rd}$ preferred directors. The content navigation system 500 will assign an index to the directors to store the $n^{th}$ preferred characteristic.

The same process is used by the content navigation system 500 to populate all the characteristics of the movies for each user profile database and the corresponding ontology. The content navigation system 500 will have a user profile database and an ontology for each user recognized by the system and the user profile database is updated periodically as the user browses the content navigation system 500 or does other activities related to movies. In addition, the user profile database is updated based on other information as will be discussed below.

While basic information that is stored in the static profile 1420 of the user profile 1400 of the user 110 is captured at registration time for each user, detailed user preferences are accumulated as described above based on the user activity and semantic clickstream analysis to provide the user with a non-intrusive environment for interacting with the content navigation system.

The content navigation system does not preclude either real-time or off-line processing of activities executed by the user and activities performed by the system for updating the user's profile. This is useful in a system where performance concern exists, or where clickstream information needs to be aggregated prior to the analysis phase.

The content navigation system also allows the user to use multiple devices to access the information of the content navigation system and the content navigation system gathers the information from the multiple devices and obtains appropriate feedback and recommendations for each device as appropriate. For example, if the user wants to listen to a song on his mobile phone instead of a TV, the content navigation system recommends a short song or a video clip that has less video input, which is more appropriate for the data processing capability of the mobile phone.

Based on the ontology 601 and the user profile 630 described above, a first capability of the content navigation system is described below. In the following, the system, method, and computer program are described with reference to the selection of movies for a better understanding of the system.

Personalized Content List Determined Based on the User Profile

Based on the ontology 601 and the user profile database 630 discussed above, the content navigation system 500 can determine a personalized content list for a specific user. The content list can include any information that the user is interested in, as for example movies, songs, etc. In the following, the determination of the personalized content list would be discussed with regard to the selection of a movie (item). However, the personalized content list determined by the content navigation system is not limited only to movies.

Figure 15A:
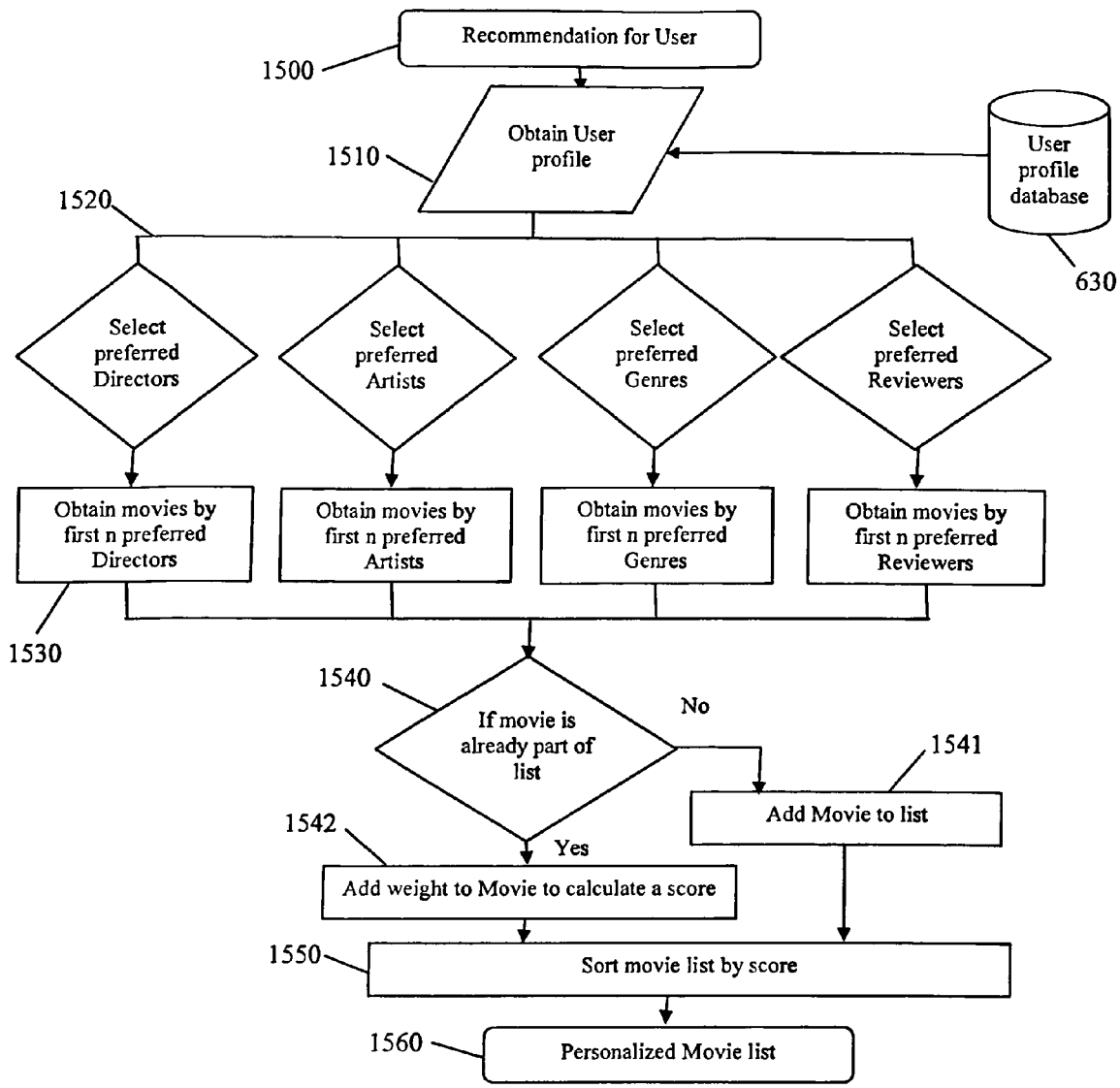
FIGS. 15A and 15B are diagrams showing the determination of a personalized movie list based on the user profile according to one embodiment of the present invention.

Turning to FIG. 15A, the flowchart of FIG. 15A illustrates an embodiment of a method of utilizing the content navigation system 500 of the present invention for determining the personalized movie list for the user based on the user's profile. In step 1500, the content navigation system 500 retrieves a list of movies prior recommended to the user. If the user uses for the first time the content navigation system 500, the list is blank. In step 1510, the content navigation system 500 retrieves the user profile from the user profile database 630 for the specific user. The user profile alternatively can be stored in the ontology 601. Step 1520 selects the preferred directors, artists, genres, and reviewers from the user profile, and in step 1530 the content navigation system 500 obtains the movies that were established in the ontology 601 to be related to the $n^{th}$ preferred director, artist, genre, and reviewer of the user. The number "n" is a setting of the content navigation system 500 and that setting can be changed by the user.

Thus, using Table 1 discussed above as an example, the content navigation system 500 will obtain in step 1530, for the movies related to the preferred directors, only those movies that were directed by directors A and B (for n=2).

Further, the content navigation system 500 compares in step 1540 whether the movies obtained in step 1530 are already on the list retrieved in step 1500, and adds the movie to the list if the movie is not on the list. Alternatively, step 1542 adds weight to the movie if the movie is already on the list. The weight determination will be discussed in greater detail below. When all the movies have been compared in step 1540 with the movies already part of the list, the movies are sorted in step 1550 by their weight and in step 1560 the content navigation system 500 provides the user with the personalized movie content list from which the user has the possibility to select a desired movie.

The factors selected in step 1530 for obtaining the preferred movies are not limited to the directors, artists, genres, and reviewers, but can be any one of the factors discussed with regard to FIG. 4.

Figure 15B:
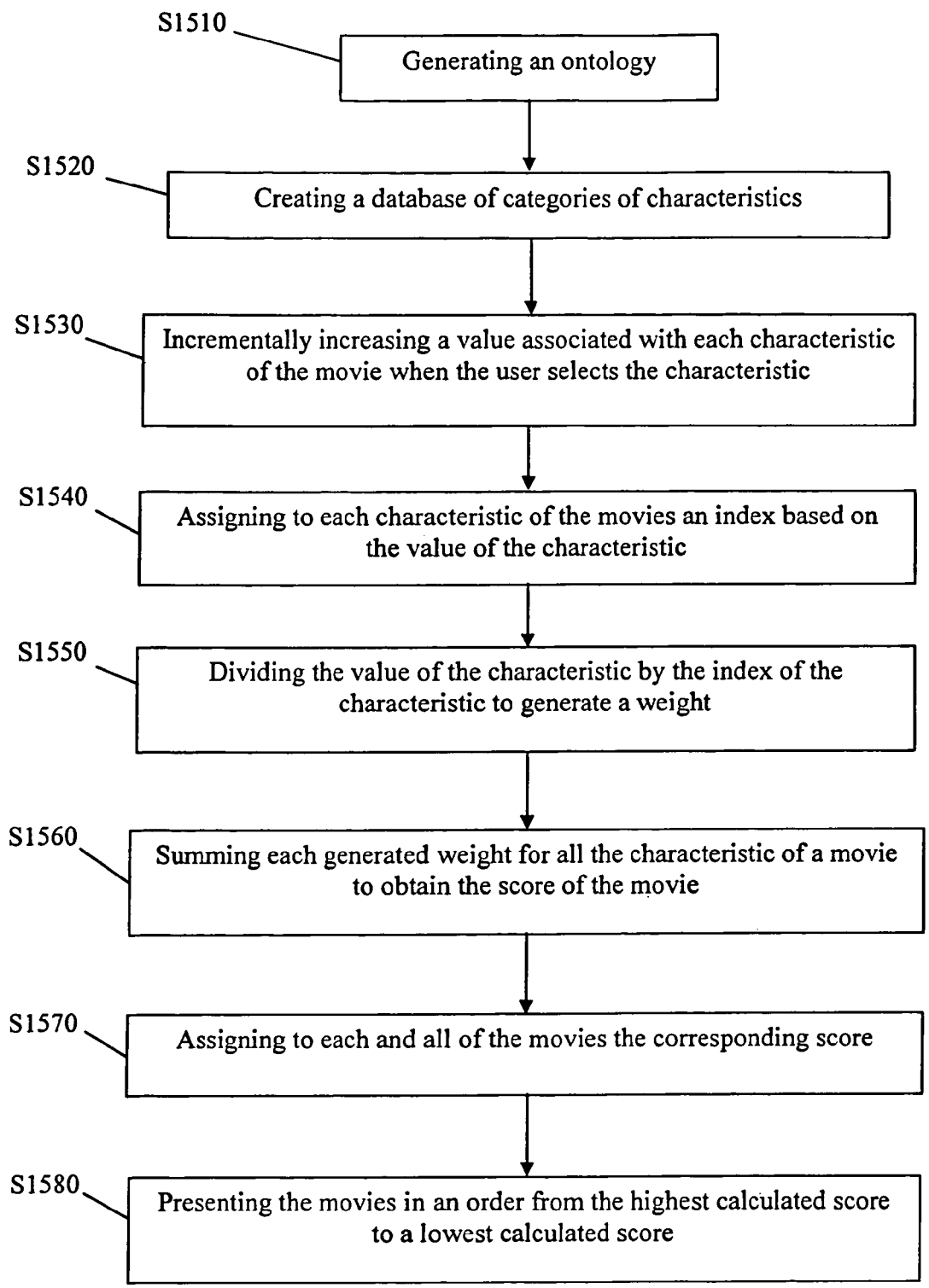

FIG. 15B shows the steps to be performed by a computer system for generating a personalized list of movies based on the profile of the user. Step S1510 generates the ontology of the user and step S1520 creates a database of categories of characteristics of the movies, i.e., artists, directors, reviewers, etc. Step S1530 incrementally increases a value associated with each characteristic of the movie when the user selects that characteristic. Step S1540 assigns to each characteristic of the movie an index based on the value of the characteristic as described above. Step S1550 divides the value of the characteristic with the index of the characteristic to generate a weight for that characteristic. Step S1560 sums the generated weights for all the characteristics of the movie to obtain the weighted score of the movie. Step S1570 assigns to each and all of the movies in the database the corresponding weighted score calculated in step S1560 and step S1580 presents the movies ordered according to their score, from a highest score to a lowest score, to the user.

Figure 16:
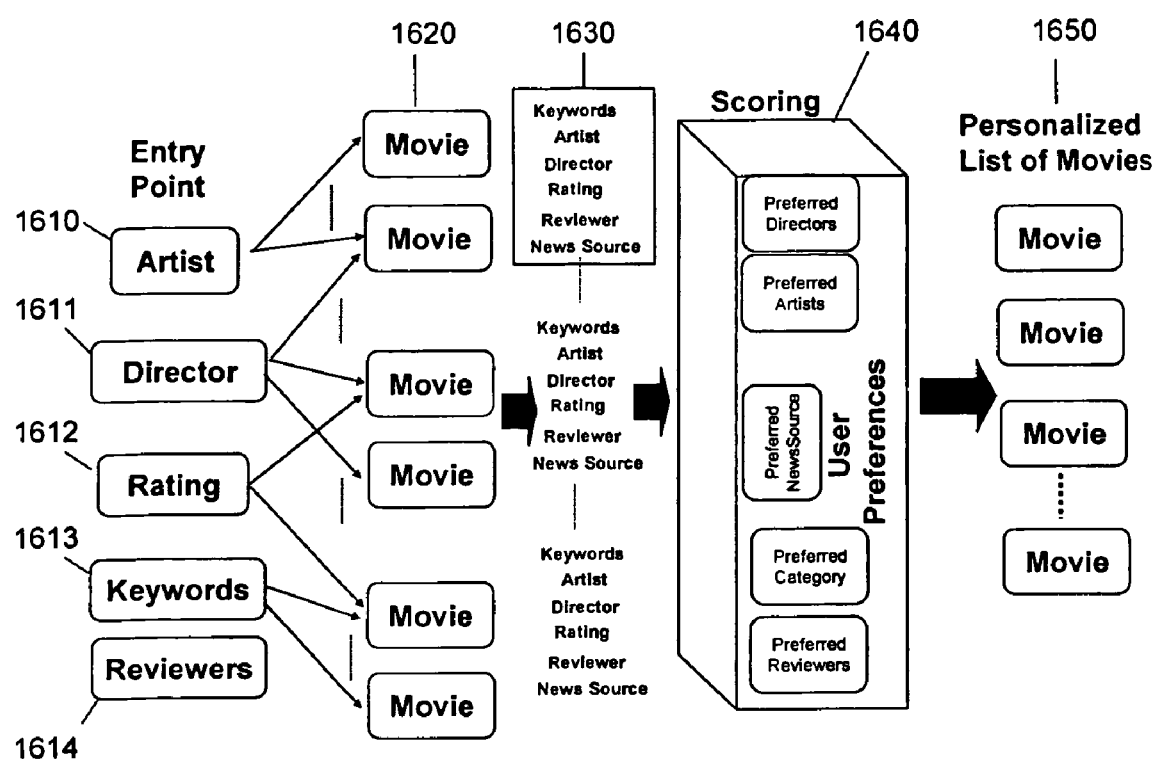
FIG. 16 is a schematical representation of the determination of the personalized list of movies based on different entry points according to one embodiment of the present invention.

The process of determining the personalized movie list for a user, described with reference to FIGS. 15A and 15B, is schematically illustrated in FIG. 16. The entry points in the movie domain of FIG. 16 are artist 1610, director 1611, rating 1612, keyword 1613, reviewer 1614. Each entry point 1610 to 1614 generates a list of movies 1620 and each movie is associated with various characteristics 1630 of the movie. Depending on the entry points 1610 to 1614 (which are not limited to artists, directors, ratings, keywords, reviewers), the user preferences module 1640 scores each movie based on the personalized movie weight MW, which will be discussed later. Based on the personalized movie weight MW calculated for each movie, the personalized list of movies 1650 is provided to the user.

The personalized movie weight MW is defined:

$$\text{Personalized Movie Weight } (MW) = \sum_{i=0}^{i=Na}(AWi/Ni) + \sum_{i=0}^{i=Nd}(DWi/Ni) + \sum_{i=0}^{i=Ng}(GWi/Ni) + \sum_{i=0}^{i=Nr}(RWi/Ni) \quad (1)$$

in which:

(AW)=Importance of Artist as a Movie component in User's Movie Ontology (i.e. Weight of Artist Component);

(DW)=Importance of Director as a Movie component in User's Movie Ontology (i.e. Weight of Director Component);

(GW)=Importance of Genre as a Movie component in User's Movie Ontology (i.e. Weight of Genre Component);

(RW)=Importance of Reviewer as a Movie component in User's Movie Ontology (i.e. Weight of Reviewer Component);

(MW)=Personalized weight of a movie;

(Ng)=Number of Genres;

(Na)=Number of Artists;

(Nd)=Number of Directors;

(Nr)=Number of Reviewers; and ($N_i$)=Index of preferred artist, director, genre, reviewer.

In the above formula for the personalized movie weight MW, based on the example discussed above with reference to Table 1, the term DW would be 1 for director A, 2 for director B, 3 for director C, and 0 for the remaining of the directors. The corresponding index $N_i$ for the above directors would be 2, 1, 2, and 3, as determined based on the ontology (director B is the first preferred director, thus index 1, directors A and C are the second preferred directors, thus index 2, etc.). The other factors AW, GW, and RW are calculated similar to DW.

The personalized movie weight MW given by formula (1) is calculated for each movie as discussed above with reference to FIGS. 14 and 15A-B and a list of the movies is provided by sorting the movies based on the personalized movie weight MW of each movie.

Figure 17:
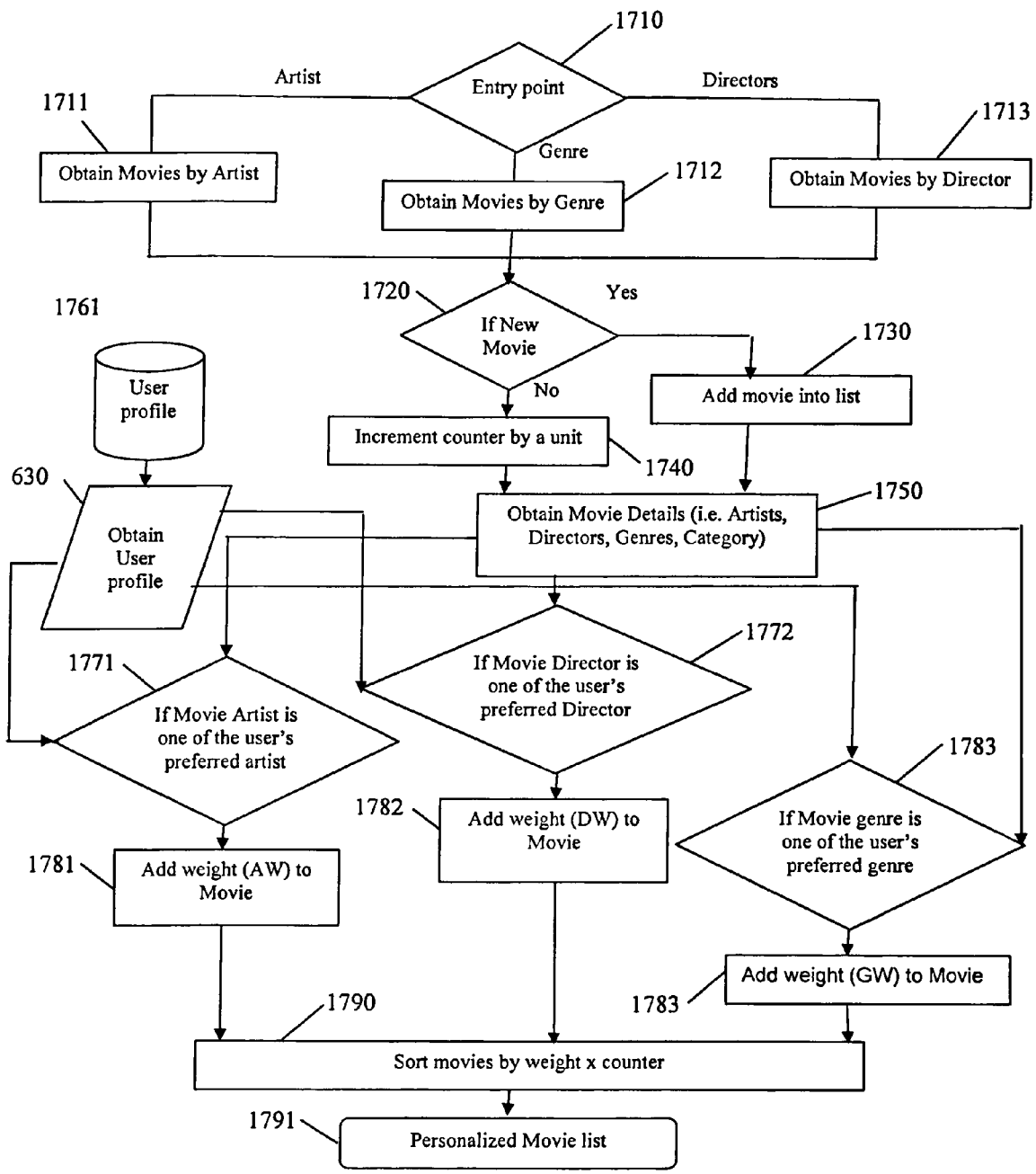
FIG. 17 is a diagram showing the determination of the personalized movie list based on an artist, a genre, or a director according to one embodiment of the present invention.

For example, FIG. 17 shows how the personalized movie list is generated by the content navigation system 500 for a user based on one of the artist, genre, or director. FIG. 17 is similar to FIG. 15A with the exception that instead of calculating an overall weight of a movie based on a combination of preferred factors, the weight in the instant case is calculated only for those movies that have a characteristic selected by the user. More specifically, step 1710 requires the user to enter a preferred characteristic and in step 1740 the system increments a counter value associated with the movie if the movie has been selected multiple times by the user (i.e., the movie was selected through the actor, the genre, etc.). Depending of the entered characteristic (assume artist), step 1711 retrieves only those movies that have the artist desired by the user. Further, steps 1771-1773 show that depending whether the artist, director, or genre is preferred by the user, a corresponding weight AW, DW, or GW, respectively, is added to the movie and in step 1790 the movies are sorted by their weight multiplied by the movie counter to generate the personalized movie list in step 1791.

Personalized Content Recommendation Based on the Social Network of the User

Another capability of the content navigation system 500 is to determine a personalized content list for a specific user based on the social network of friends of the user. The content navigation system 500 determines a personalized social network for the user and then, based on the social network produces a personalized list of movies.

Figure 18:
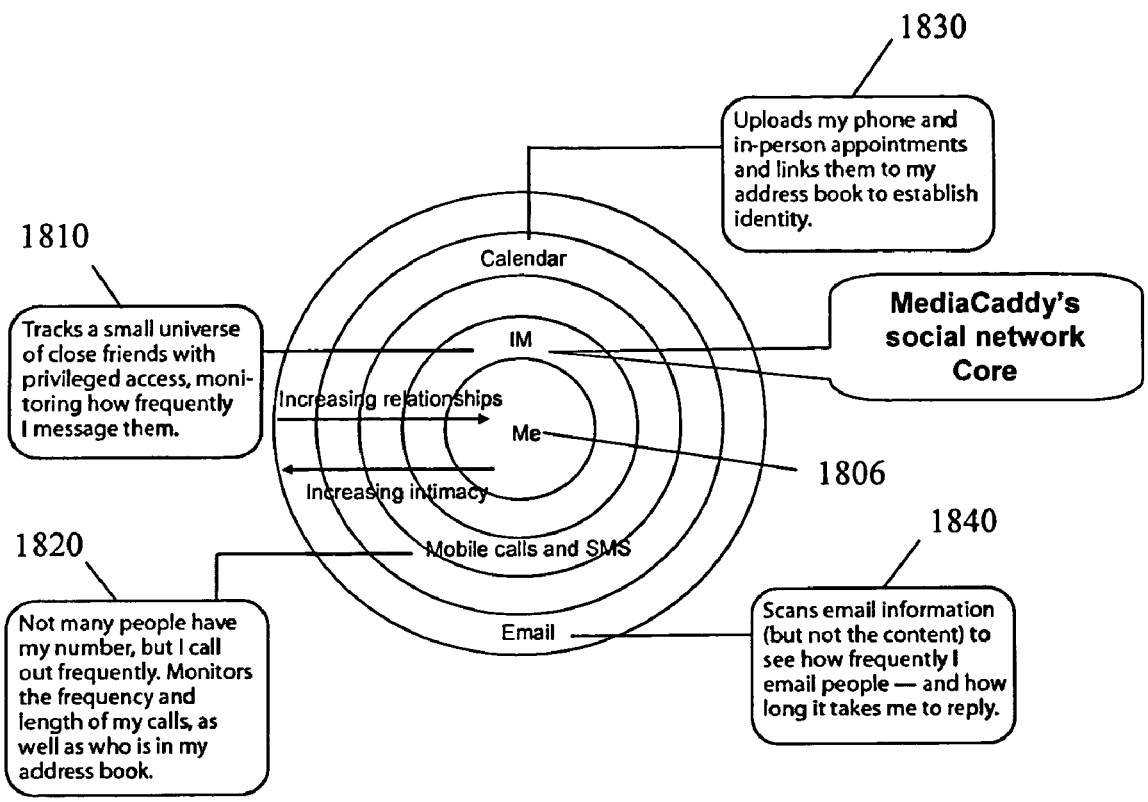
FIG. 18 is a schematical representation of the relationships between the user and the social network of the user.

FIG. 18 shows the results of a study performed in July, 2004, by Forrester Research Group (which is an independent technology research company that provides forward-thinking advice about technology's impact on business) about the real value of a social network of a user. According to FIG. 18, the user is represented in the center of the figure and the people who interact with the user through various means are represented in concentric circles positioned around the user. The people who interact with the user are classified as: people who exchange Instant Messages IM with the user (circle 1810), people who exchange phone calls and short messages via mobile phones with the user (circle 1820), people who interact with the user via other means, i.e., appointments, etc. (circle 1830), and people who are exchanging emails with the user (circle 1840). From among these categories of people, the study has found that the people of circle 1810 represent the core of the social network of the user. Thus, in an exemplary embodiment of the present invention the social network of the user is based on all the friends of the user that exchange IM with the user.

Figure 19:
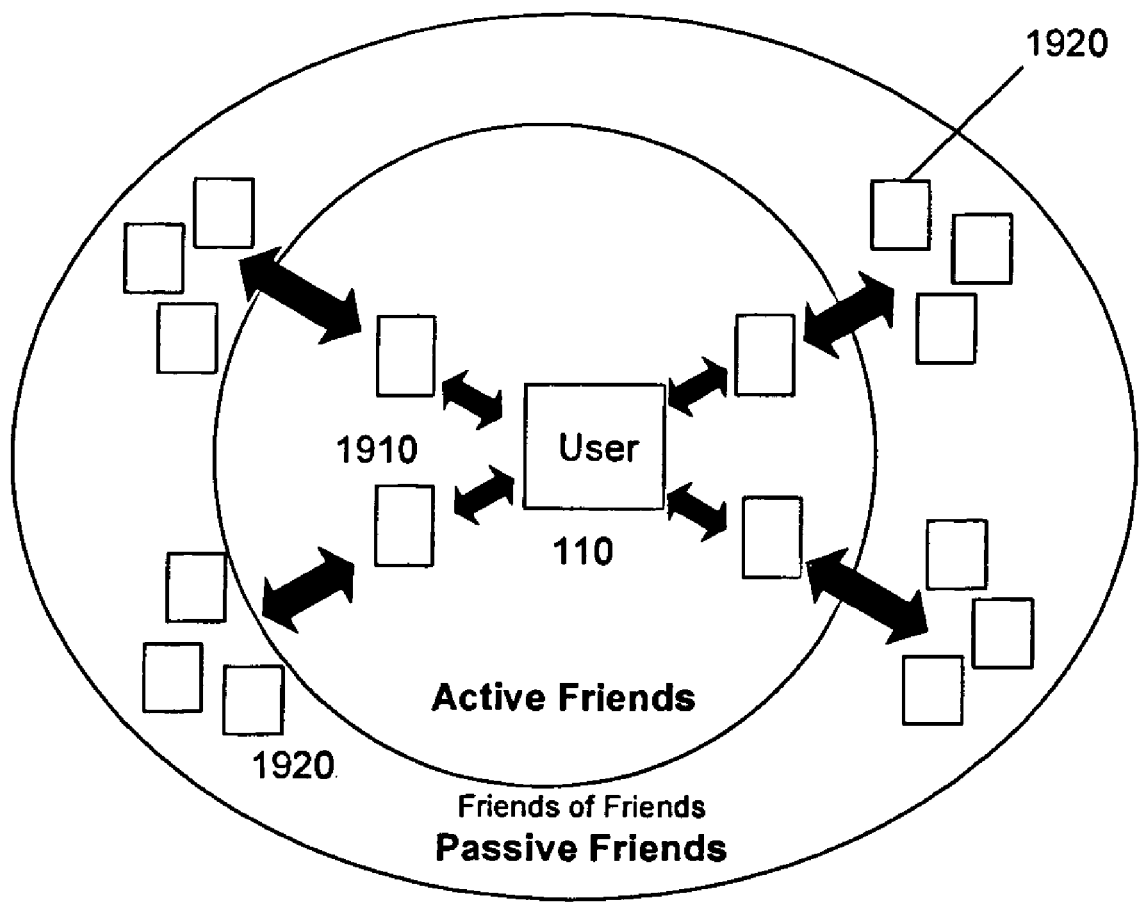
FIG. 19 is a schematical representation of the relationships between the user and the active friends and between the active friends of the user and the passive friends of the user.
Figure 20:
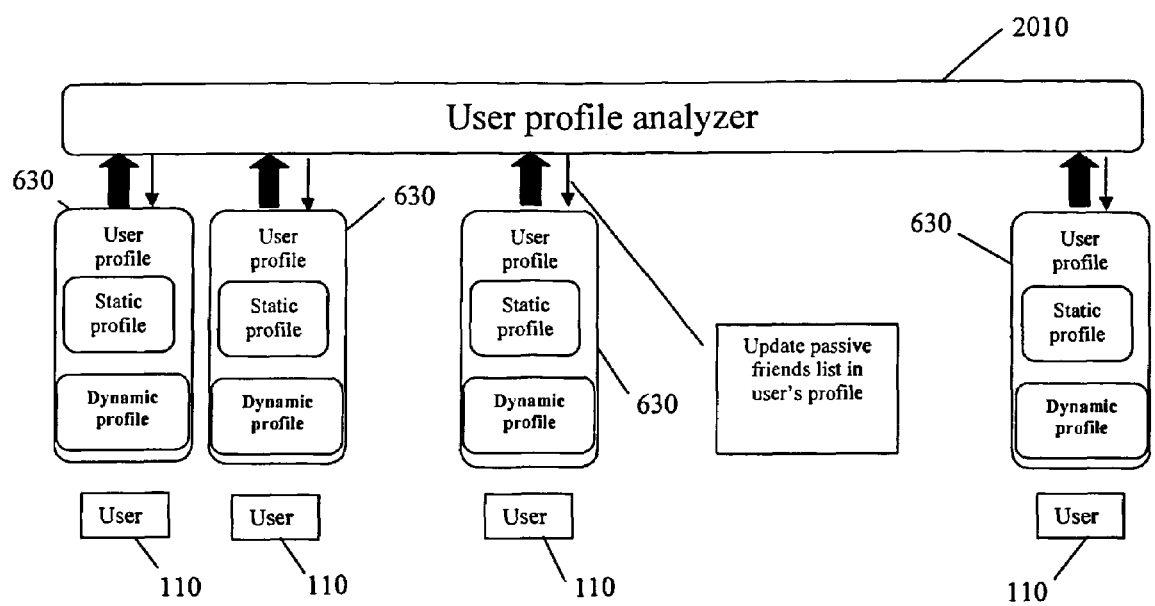
FIG. 20 is a schematical representation of how the content navigation system updates the user's profile regarding the passive friends according to one embodiment of the present invention.

The people who interact directly with the user via IM are designated active friends and the friends of the active friends who interact with the active friends of the user via IM are designated passive friends. Thus, the user might not know the passive friends. FIG. 19 shows the relationships between the user and the active friends 1910 and between the active friends 1910 and the passive friends 1920. Further, FIG. 20 schematically shows how a user profile analyzer module 2010 analyses the active and passive-friends of each user 110 and updates the user profile 630 of each user with the passive friends. The process of determining the passive friends and updating the user's profile will be described in greater details below. The content navigation system can consider the active friends as well when determining the list of movies to be recommended to the user. However, in the present embodiment only the passive friends are considered.

Figure 21:
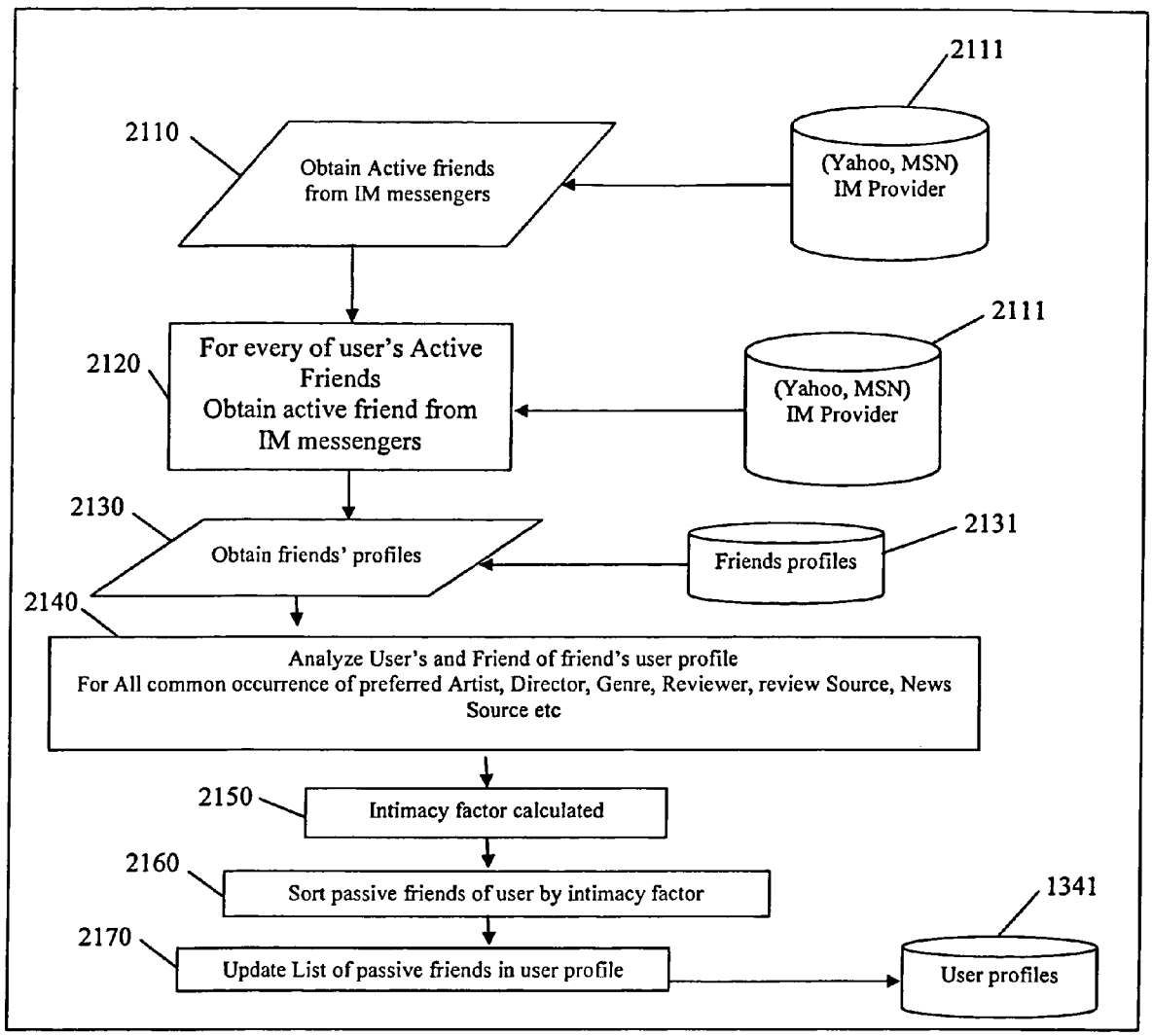
FIG. 21 is a diagram showing the selection of passive friends to be included in the user's profile according to one embodiment of the present invention.

The flowchart of FIG. 21 illustrates an embodiment of a method that selects the passive friends of the user based on an intimacy factor that will be described in greater detail below. In step 2110, the content navigation system 500 obtains the active friends of the user from IM messages exchanged between the user and the active friends. The active and passive friends are either registered with the content navigation system 500 and have their own user profile in the system or are registered with other systems to which the content navigation system 500 has access.

The IM providers 2111 are any one of Yahoo, MSN, etc. In step 2120, the content navigation system 500 retrieves the active friends of the active friends of the user, or in other words, the passive friends of the user based on the same IM providers 2111. In step 2130, the content navigation system 500 obtains the profile of the passive friends of the user from their corresponding profiles 2131. In step 2140 the content navigation system 500 analyzes the profiles of the passive friends (which are similar in structure to the user profile discussed above) and calculates an intimacy factor between the user and each passive friend based on common occurrences of preferred artist, director, genre, reviewer, etc. of the user.

If a common occurrence is detected between the user and a passive friend, the intimacy factor associated with each passive user is increased by a unit in step 2150, as will be discussed further. In step 2160 the passive friends of the user are sorted based on the calculated intimacy factor and in step 2170 the user's profile is updated to reflect the first $n^{th}$ close passive friends of the user. A close passive friend of the user is determined when the intimacy factor of the passive friend is higher relative to another passive friend, i.e., the preferences of the close passive friend are similar to the preferences of the user. The first n passive friends of the user are used by the content navigation system 500 to determine the personalized movie list for the user based on the social network.

The intimacy factor (or friendship factor) is calculated according to the formula:

$$\text{Friendship Factor } (IF) = \sum_{i=0}^{i=n}(AWi/Ni) + \sum_{i=0}^{i=n}(DWi/Ni) + \sum_{i=0}^{i=n}(GWi/Ni) + \sum_{i=0}^{i=n}(RWi/Ni) + \sum_{i=0}^{i=n}(RsWi/Ni) + \sum_{i=0}^{i=n}(NsWi/Ni) \quad (2)$$

in which:

(IF)=User's "Friendship Factor" with any potential passive friend;

(AW)=Importance of Artist as a Movie component in User's Movie domain (i.e. Weight of Artist Component);

(DW)=Importance of Director as a Movie component in User's Movie domain (i.e. Weight of Director Component);

(GW)=Importance of Genre as a Movie component in User's Movie domain (i.e. Weight of Genre Component);

(RW)=Importance of Reviewer as a Movie component in User's Movie domain (i.e. Weight of Reviewer Component);

(RsW)=Importance of Review Source as a Movie component in User's Movie domain (i.e. Weight of Review Source Component);

(NsW)=Importance of News Source as a Movie component in User's Movie domain (i.e. Weight of News Source Component);

(i)=Number of common entries of preferred artist, Director, genre, reviewer, review sources, news source in user's and passive friends' profiles;

(n)=Number of entries in preferred artist, Director, genre, reviewer, review sources and news source tables of user profiles; and (N)=Index difference of preferred artist, Director, genre, reviewer, review sources and news source tables of user and passive friends' profiles. When the index difference is calculated to be zero, the index is substituted with one in the above formula.

The AW to NsW factors have been discussed above, and the remaining of the factors will be explained based on an example shown in Table 2, which is not intended to limit the present invention. Table 2 shows a condensed version of the user's profile and the profiles of two of the user's passive friends. Table 2 also shows artists A to D and the importance AW of the artists for the user and the passive friends.

TABLE 2

|        | user |   |   | Passive friend 1 |   |   | Passive friend 2 |   |   |   |
|--------|------|---|---|------------------|---|---|------------------|---|---|---|
| Actors | A    | B | C | A                | B | C | A                | B | C | D |
| AW     | 3    | 4 | 6 | 1                | 3 | 5 | 3                | 7 | 3 | 2 |

According to formula (2), the importance AW of artists A to C for the user is read from the user's profile, third row, and the values for the user are 3, 4, and 6. The index difference between the user and the passive friend 1 is 3−1=2, 4−3=1, and 6−5=1, for A, B, and C, respectively. The index difference between the user and the passive friend 2 is 0, −3, 3, and −2 for actors A, B, C, and D, respectively. Thus, the intimacy factor of the passive friend 1, based on the above example, is $IF_1$=3/2+4/1+6/1=11.5 and for the passive friend 2 is $IF_2$=3/1+4/(−3)+6/3=3.6. As can be seen from Table 2 and the above calculated intimacy factors, the passive friend 1 has a profile more close to the user than the passive friend 2.

However, in a real situation handled by the content navigation system 500 of the present invention, the entries of all the actors, directors, genres, etc. are so numerous (thousand of entries) that it is not possible to compare the profiles of the user and the passive friends without using the content navigation system 500 that uses formula (2). Thus, based of formula (2) and the process shown in FIG. 21, the social network of the user (the closest passive friends of the user) is generated. Likely, a social network is generated for each user that uses the content navigation system 500.

Figure 22A:
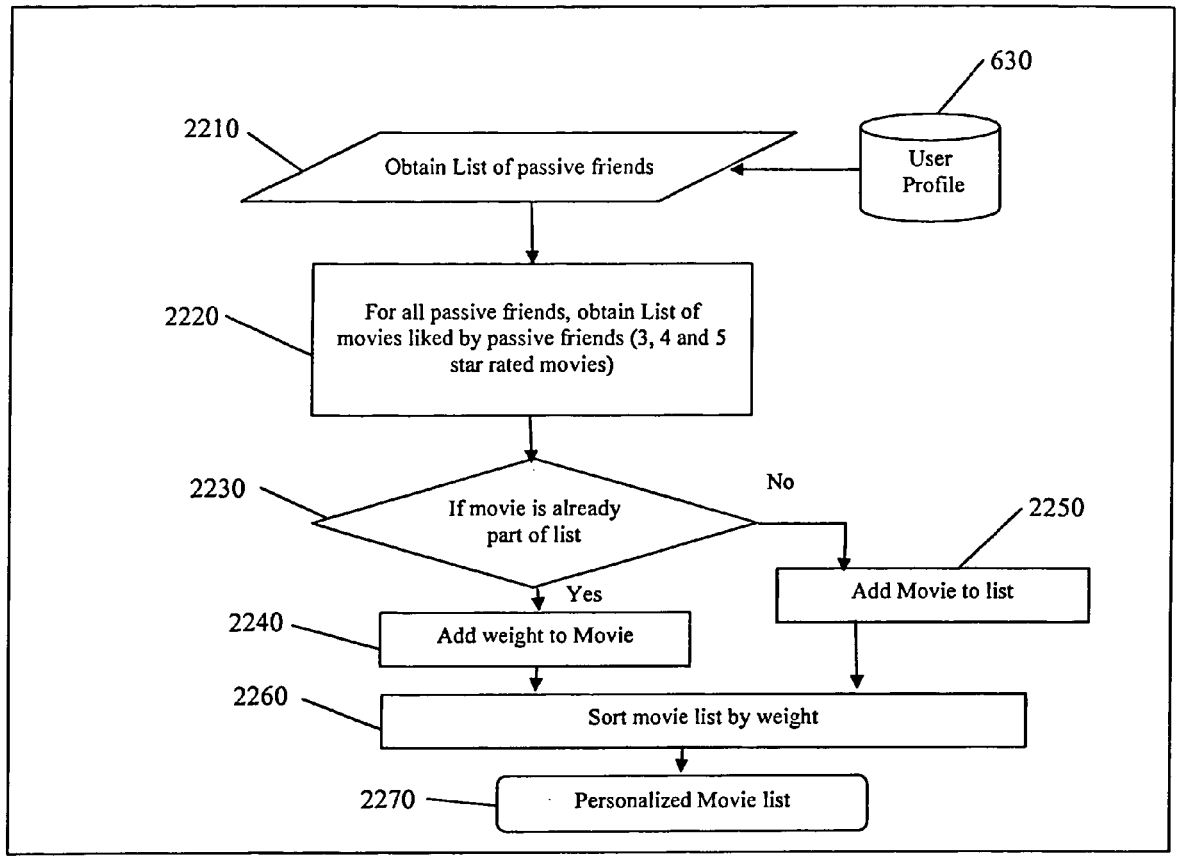
FIGS. 22A and 22B are diagrams showing the determination of a personalized movie list based on the passive friends from the social network of the user according to one embodiment of the present invention.

Having generated the social network for the user, the content navigation system 500 is capable to recommend a list of personalized movies to the user based on the social network of the user. Thus, the content navigation system of the present embodiment personalizes the movies recommended to the user based on the preferences of the passive friends from the social network of the user. FIG. 22A is a diagram showing the determination of a personalized movie list based on the passive friends of the user. In step 2210 the content navigation system 500 obtains the passive friends of the user from the user profile 630. The passive friends have been determined as discussed above with regard to FIG. 21. In step 2220 the content navigation system 500 retrieves the movies rated by the passive friends. In step 2230, the content navigation system 500 analyzes if each retrieved movie rated by the passive friends is part of a predetermined list of movies and adds a weight in step 2240 to the movie if the movie is already on the list. If the movie is not on the list, in step 2250 the movie is added to the list. In step 2260 the movies are sorted by the weight, which will be discussed in greater detail below, and in step 2270 the personalized movie list is provided to the user.

The weight discussed in step 2240 is calculated with formula:

$$\text{Social network based Movie Weight } (MW_{sn}) = \sum_{i=0}^{i=n} (MRi/Ni) \quad (3)$$

in which:

(MR)=Movie ratings (3, 4 or 5 stars);

(MWsn)=Weight of a movie based on personalized social network;

(N)=Index of movie in passive friend's profile; and (n)=number of passive friends.

Thus, the content navigation system 500 in the present embodiment is capable of providing the user with a list of movies ordered based on the preferences of the passive friends from the social network of the user.

Figure 22B:
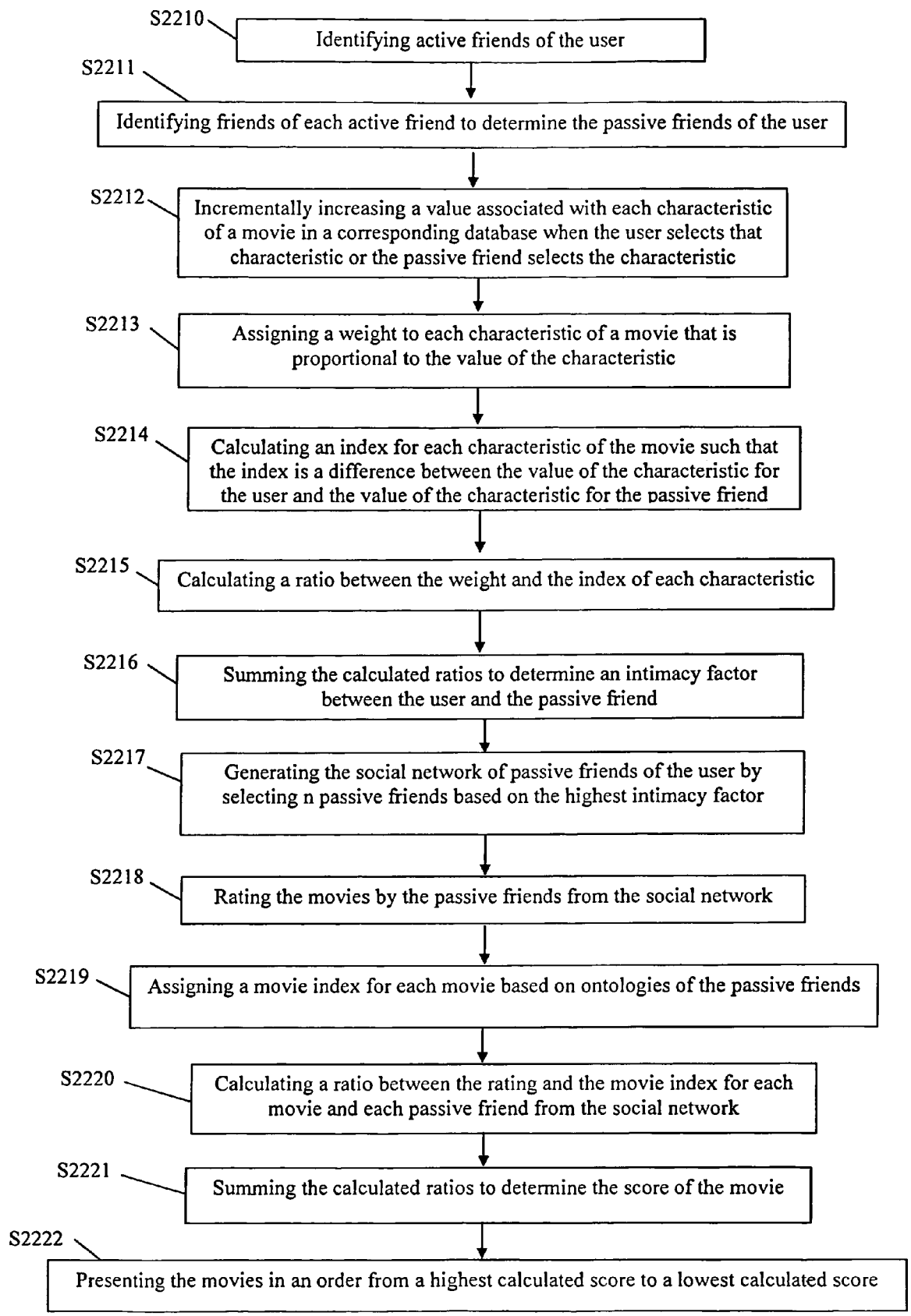

FIG. 22B shows the steps to be performed by a computer system for generating a personalized list of movies based on the passive friends from the social network of the user. Step S2210 identifies active friends of the user and step S2211 identifies friends of each active friend to determine the passive friends of the user. The active friends are identified by the computer system by analyzing instant messages exchanged the user with any friend. The passive friends of the user are determined by identifying the active friends of the active friends of the user by a similar method as described above. Step S2212 incrementally increases a value associated with each characteristic of the movie in a corresponding database, when the user selects the characteristic or the passive friend selects the characteristic. Step S2213 assigns a weight to each characteristic of the movie that is proportional to the value of the characteristic.

Step S2214 calculates an index for each characteristic of the movie such that the index is a difference between the value of the characteristic for the user and the value of the characteristic for the passive friend. Step S2215 calculates a ratio between the weight and the index of each characteristic and step S2216 sums the calculated ratios to determine an intimacy factor between the user and each passive friend. Step S2217 generates the social network of passive friends by selecting n passive friends based on the highest intimacy factor. Step S2218 rates the movies by the passive friends from the social network of the user and step S2219 assigns a movie index to each movie based on the ontologies of the passive friends from the social network. Step S2220 calculates a ratio between the rating and the movie index for each movie and each passive friend from the social network. Step S2221 sums the calculated ratios to determine the weighted score of the movie and step S2222 presents the movies in an order from a highest calculated weighted score to a lowest calculated score, to the user.

Personalized Content Recommendation Based on the Mood of the User

Another capability of the content navigation system 500 is to determine a personalized content list for a specific user based on the mood of the user. The content navigation system 500 determines the mood of the user when the user logs into the system and browses the system and then, based on that specific mood, the system produces a personalized list of movies. The present method for determining the personalized content recommendation is independent of the user's profile or the social network of the user.

The content navigation system 500 determines the user's interaction with the system and records each activity of the user while the user is logged in into the system. The activities detected and stored by the content navigation system 500 have been discussed with regard to FIGS. 9-12, and those activities are selection activities, session activities, content activities, and menu activities. During this stage, knowledge is extracted from the user's activities. During the knowledge extraction process, any of the user's clicks which were directly or indirectly related to any movie, are filtered. Once filtered, these clicks represent entity instances in the movie domain.

All of the entity instances filtered during the knowledge extraction stage become entry points for content navigation in the movie domain ontology. For example, if a previous stage had actors A1 and A2 as instances of artist entity, G1 and G2 as instances of genre entity, and M1 and M2 as instances of the movie entity, these entity instances become entry points for the content navigation process.

Figure 23:
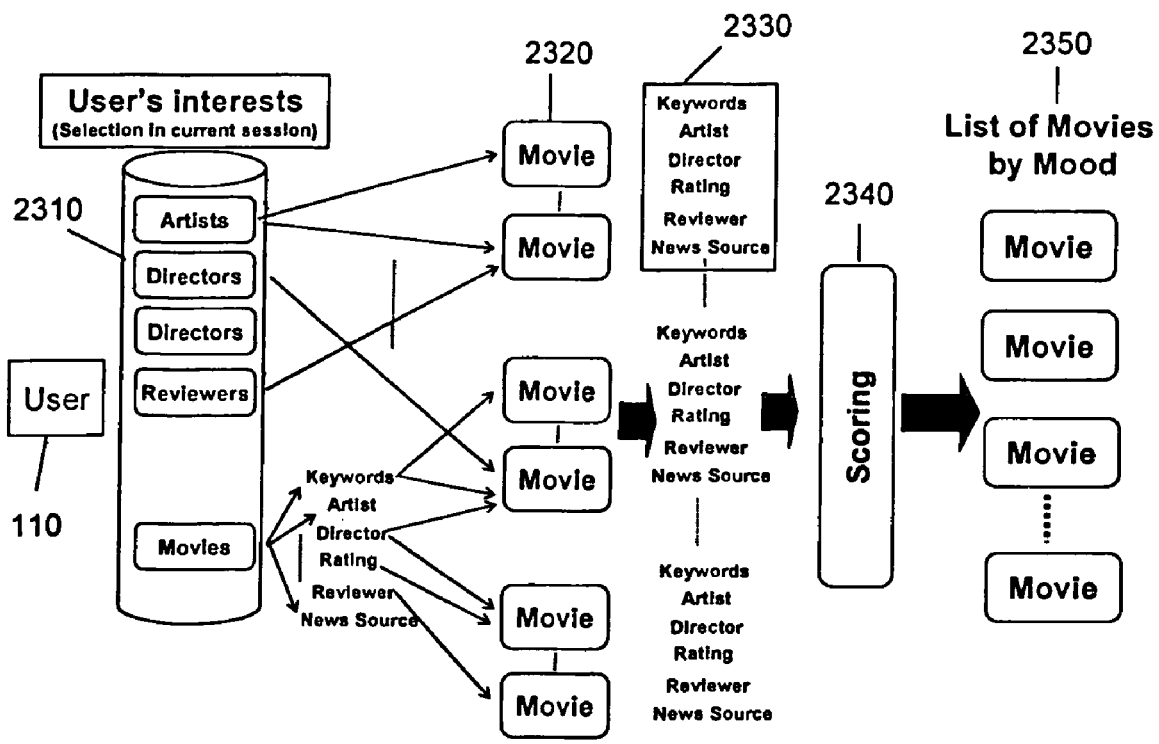
FIG. 23 is a schematical representation of the content navigation system based on a mood of the user according to one embodiment of the present invention.

The present navigation method is schematically illustrated in FIG. 23. The user 110 interacts with the content navigation system 500 based on the user's interests 2310. Each of the user's interests determines a list of movies 2320 and associated characteristics 2330 of the movies. The movies 2320 are scored and assigned a weight by the scoring module 2340 as will be described in greater details below. Then, the content navigation system 500 provides the list of movies 2350 ordered based on the mood of the user.

Figure 24A:
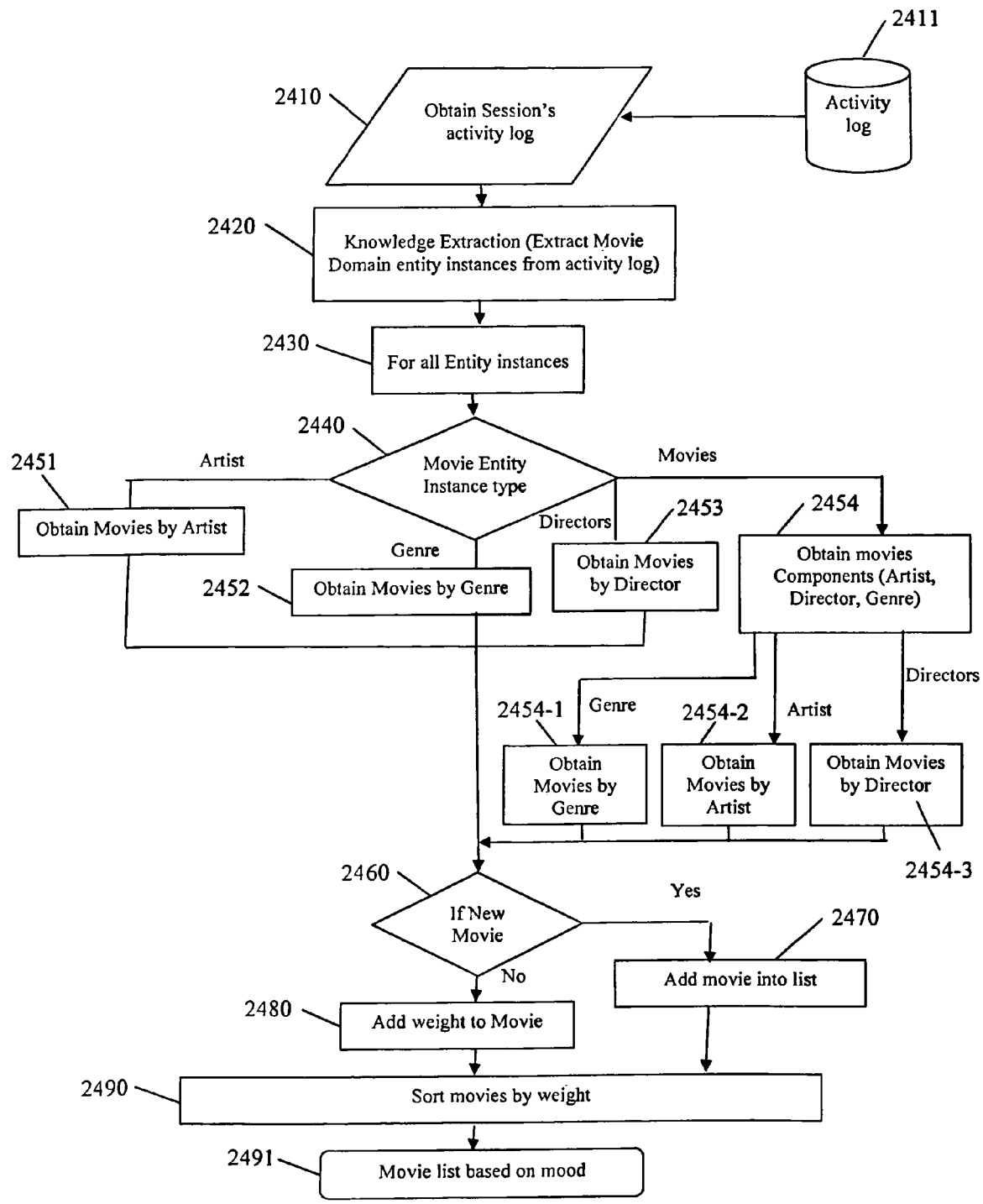
FIGS. 24A and 24B are diagrams showing the determination of a personalized movie list based on the mood of the user according to one embodiment of the present invention.

Turning to FIG. 24A, the flowchart of FIG. 24A illustrates an embodiment of a method of utilizing the content navigation system of the present invention for determining a personalized list of movies for the user based on the mood of the user. In step 2410 the content navigation system 500 obtains the session's activity log from the activity log 2411 and in step 2420 the content navigation system 500 extracts knowledge information regarding the movie domain entities. For all entity instances detected in step 2430 the movie entity instance type is determined in step 2440 as being an artist, genre, director or a movie and then in steps 2451 to 2454 a list of the movies based on the artists, genre, director, or other movie components is obtained. Step 2454 corresponds to an indirect relation between the user and the movie and steps 2451-2453 correspond to the direct relation in selecting a movie by the user. The step 2454 includes the substeps 2454-1 to 2454-3 in which the characteristics of the movie, i.e., genre, artist, director are selected and based on these characteristics a list of movies having those actors, directors, genre, etc. is generated. In other words, steps 2454-1 to 2454-3 provide movies similar to the movie selected by the user in step 2440.

In step 2460 the content navigation system 500 determines whether the movie is new to a predetermined list of movies, and if the movie is new the movie is added in step 2460 to the list. If the step 2460 determines that the movie is not new, the system adds in step 2480 a weight to the movie, which weight will be described in greater detail below. In step 2490 the content navigation system 500 orders the movies by the movie weight based on the mood of the user and in step 2491 the content navigation system 500 lists the movies based on the mood of the user.

The weight of the movie is defined by the formula:

Movie Weight based on mood (MW)=$A \cdot n + D \cdot n + G \cdot n + MA \cdot n + MD \cdot n + MG \cdot n$ in which:

(A)=Weight of movie if found via direct relationship with the artist;

(D)=Weight of movie if found via direct relationship with the director;

(G)=Weight of movie if found via direct relationship with the genre;

(MA)=Weight of movie if found via indirect relationship with the artist (Movie→Artists→Movies);

(MD)=Weight of movie if found via indirect relationship with the director (Movie→Directors→Movies);

(MG)=Weight of movie if found via indirect relationship with the genre (Movie→Genres→Movies);

(MW)=Weight of a movie based on the current mood of the user; and (n)=Occurrence of a single entity instance in current session log.

The weights A, D, and G are assigned to a movie if the user has made a direct connection between the artist, director, or genre and the movie, and the weights MA, MD, and MG are assigned to the movie if the user has made an indirect connection between the artists, director, or genre and the movie. More specifically, when the user browses the content navigation system 500 and retrieves a page that have information about actor A, and then the user selects movie M in which actor A plays, the direct connection between the actor A and the movie M is established. If the user first selects a movie M1 in which actor A plays, then selects the actor A, and then selects a movie M2 in which the actor A also plays, an indirect connection between the movie M2 and the artist A is established. The above discussed weights assigned to the movies based on the direct and indirect relationships are the same or different, the weights being settings of the content navigation system 500 that could be adjusted to a desired level.

Figure 24B:
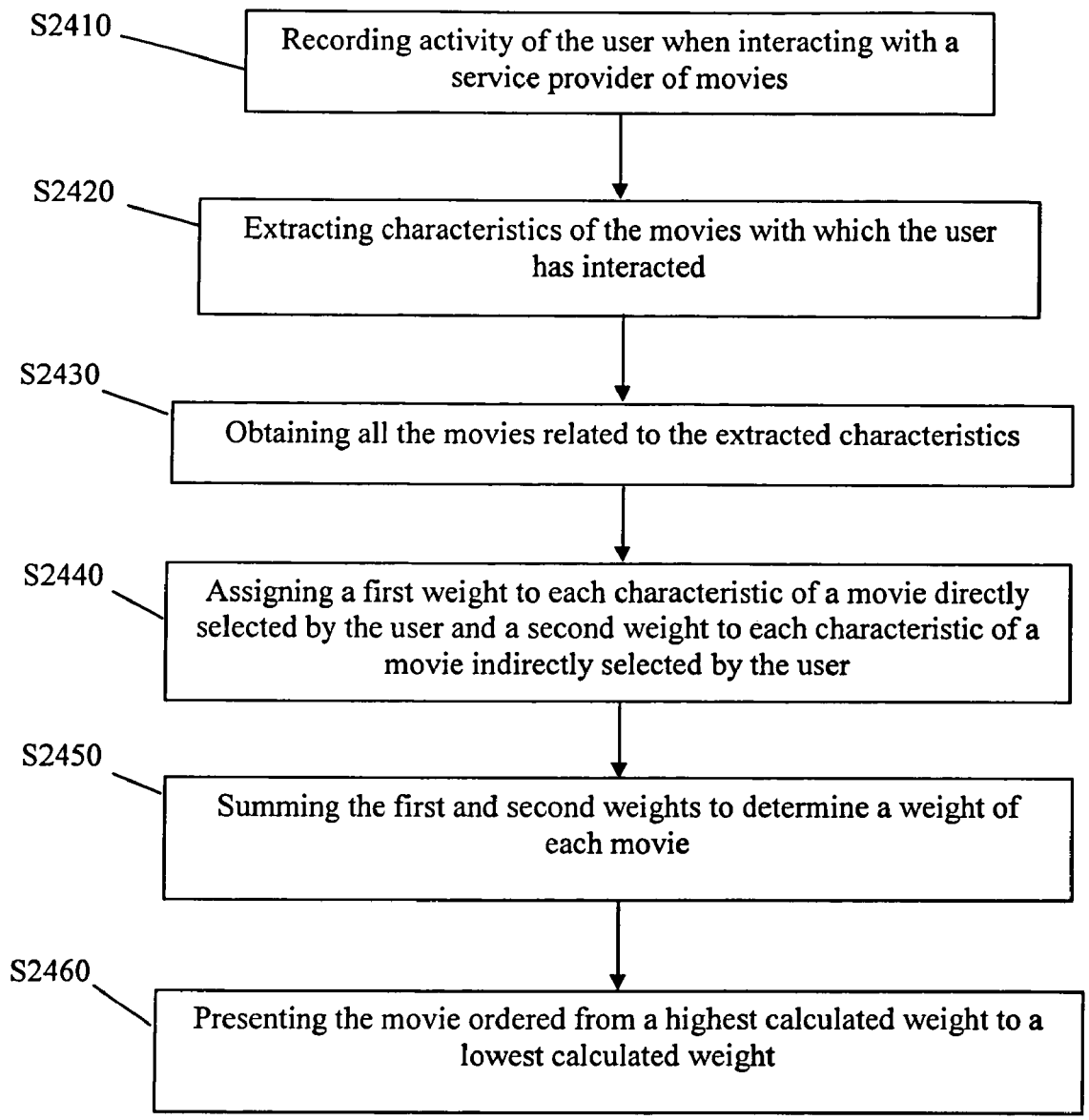

FIG. 24B shows the steps to be performed by a computer system for generating a personalized list of movies based on the mood of the user. Step S2410 records the activities of the user when interacting with a service provider of movies and step S2420 extracts characteristics of the movies with which the user has interacted during a current session. Step S2430 obtains all the movies related to the extracted characteristics. Step S2440 assigns a first weight to each characteristic of a movie that is directly selected by the user and a second weight to each characteristic of the movie that is indirectly selected by the user. Selecting characteristics directly or indirectly have been discussed above. Step S2450 sums the first and second weights to determine a weight of each movie and step S2460 presents the movies to the user ordered within a list, from a highest calculated weight to a lowest calculated weight.

Figure 25:
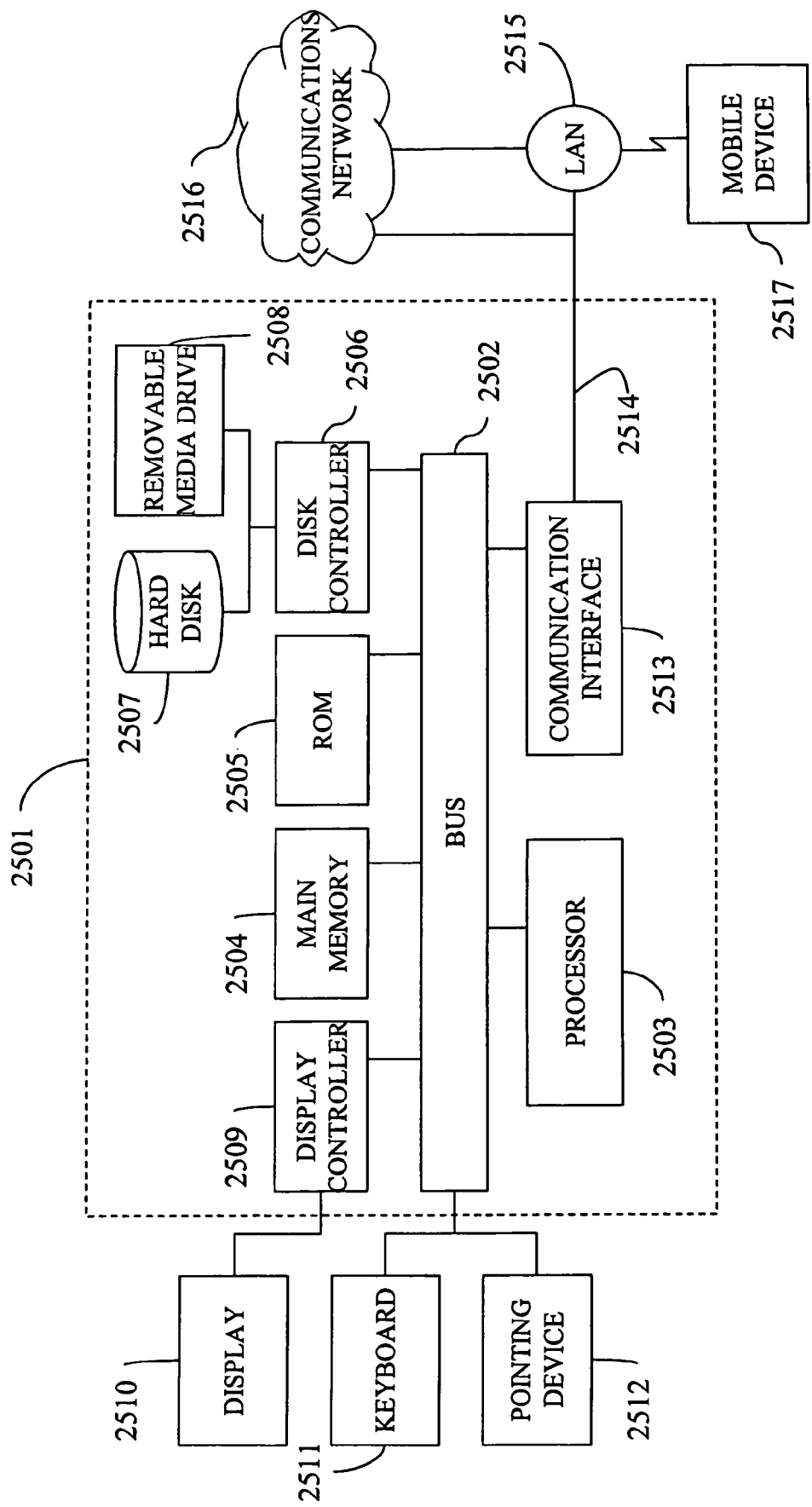
FIG. 25 is a schematical representation of a computer system which can be programmed according to any of the embodiments of this invention to determine a personalized movie list for a user based on various criteria.

FIG. 25 illustrates a computer system 2501 upon which any embodiment of the present invention may be implemented. The computer system 2501 includes a bus 2502 or other communication mechanism for communicating information, and a processor 2503 coupled with the bus 2502 for processing the information. The computer system 2501 also includes a main memory 2504, such as a random access memory (RAM) or other dynamic storage device (e.g., dynamic RAM (DRAM), static RAM (SRAM), and synchronous DRAM (SDRAM)), coupled to the bus 2502 for storing information and instructions to be executed by processor 2503. In addition, the main memory 2504 may be used for storing temporary variables or other intermediate information during the execution of instructions by the processor 2503. The computer system 2501 further includes a read only memory (ROM) 2505 or other static storage device (e.g., programmable ROM (PROM), erasable PROM (EPROM), and electrically erasable PROM (EEPROM)) coupled to the bus 2502 for storing static information and instructions for the processor 2503.

The computer system 2501 also includes a disk controller 2506 coupled to the bus 2502 to control one or more storage devices for storing information and instructions, such as a magnetic hard disk 2507, and a removable media drive 2508 (e.g., floppy disk drive, read-only compact disc drive, read/write compact disc drive, compact disc jukebox, tape drive, and removable magneto-optical drive). The storage devices may be added to the computer system 2501 using an appropriate device interface (e.g., small computer system interface (SCSI), integrated device electronics (IDE), enhanced-IDE (E-IDE), direct memory access (DMA), or ultra-DMA).

The computer system 2501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 2501 may also include a display controller 2509 coupled to the bus 2502 to control a display 2510, such as a cathode ray tube (CRT), for displaying information to a computer user. The computer system includes input devices, such as a keyboard 2511 and a pointing device 2512, for interacting with a computer user and providing information to the processor 2503. The pointing device 2512, for example, may be a mouse, a trackball, or a pointing stick for communicating direction information and command selections to the processor 2503 and for controlling cursor movement on the display 2510. In addition, a printer may provide printed listings of data stored and/or generated by the computer system 2501.

The computer system 2501 performs a portion or all of the processing steps of the invention in response to the processor 2503 executing one or more sequences of one or more instructions contained in a memory, such as the main memory 2504. Such instructions may be read into the main memory 2504 from another computer readable medium, such as a hard disk 2507 or a removable media drive 2508. One or more processors in a multi-processing arrangement may also be employed to execute the sequences of instructions contained in main memory 2504. In alternative embodiments, hard-wired circuitry may be used in place of or in combination with software instructions. Thus, embodiments are not limited to any specific combination of hardware circuitry and software.

As stated above, the computer system 2501 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 2501, for driving a device or devices for implementing the invention, and for enabling the computer system 2501 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 2503 for execution. A computer readable medium may take many forms, including but not limited to, non-volatile media, volatile media, and transmission media. Non-volatile media includes, for example, optical, magnetic disks, and magneto-optical disks, such as the hard disk 2507 or the removable media drive 2508. Volatile media includes dynamic memory, such as the main memory 2504. Transmission media includes coaxial cables, copper wire and fiber optics, including the wires that make up the bus 2502. Transmission media also may also take the form of acoustic or light waves, such as those generated during radio wave and infrared data communications.

Various forms of computer readable media may be involved in carrying out one or more sequences of one or more instructions to processor 2503 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 2501 may receive the data on the telephone line and use an infrared transmitter to convert the data to an infrared signal. An infrared detector coupled to the bus 2502 can receive the data carried in the infrared signal and place the data on the bus 2502. The bus 2502 carries the data to the main memory 2504, from which the processor 2503 retrieves and executes the instructions. The instructions received by the main memory 2504 may optionally be stored on storage device 2507 or 2508 either before or after execution by processor 2503.

The computer system 2501 also includes a communication interface 2513 coupled to the bus 2502. The communication interface 2513 provides a two-way data communication coupling to a network link 2514 that is connected to, for example, a local area network (LAN) 2515, or to another communications network 2516 such as the Internet. For example, the communication interface 2513 may be a network interface card to attach to any packet switched LAN. As another example, the communication interface 2513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 2513 sends and receives electrical, electromagnetic or optical signals that carry digital data streams representing various types of information.

The network link 2514 typically provides data communication through one or more networks to other data devices. For example, the network link 2514 may provide a connection to another computer through a local network 2515 (e.g., a LAN) or through equipment operated by a service provider, which provides communication services through a communications network 2516. The local network 2514 and the communications network 2516 use, for example, electrical, electromagnetic, or optical signals that carry digital data streams, and the associated physical layer (e.g., CAT 5 cable, coaxial cable, optical fiber, etc). The signals through the various networks and the signals on the network link 2514 and through the communication interface 2513, which carry the digital data to and from the computer system 2501 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 2501 can transmit and receive data, including program code, through the network(s) 2515 and 2516, the network link 2514 and the communication interface 2513. Moreover, the network link 2514 may provide a connection through a LAN 2515 to a mobile device 2517 such as a personal digital assistant (PDA) laptop computer, or cellular telephone.

Numerous modifications of the above-teachings will be apparent to those of ordinary skill in the art without departing from the general principles set forth herein.

The invention claimed is:

1. A computer program product storing instructions for execution on a computer system, which when executed by the computer system, causes the computer system to perform a method, comprising:

calculating an intimacy score for each passive friend of a user, the intimacy score being determined based upon a determined correspondence in interests;

generating a social network of passive friends of the user based on the intimacy score of each passive friend;

calculating a weighted score for each item from a list of items based on the social network of the user, and based on a generated ontology of the user, the ontology being established based on relationships between the list of items and each passive friend of the user; and presenting the items of the list based on the calculated scores of the items, wherein the calculating the intimacy score further comprises, identifying active friends of the user based upon an interaction history, to determine the passive friends of the user and creating item databases for the user and the passive friends, each data base including a same plurality of categories of characteristics for each item from the list of items, incrementally increasing a value associated with each characteristic of an item (i) in the database for the user when the user selects the characteristic and (ii) in the database for the passive friend when the passive friend selects the characteristic, assigning a weight to each characteristic of an item that is proportional to the value of the characteristic, calculating an index for each characteristic of the item such that the index is a difference between the value of the characteristic for the user and the value of the characteristic for the passive friend, calculating a ratio between the weight for each characteristic of the item and the corresponding index, and summing the calculated ratios for all the characteristics of an item and for all the items from the list of items to determine the intimacy score between the user and each of the passive friends.

2. The computer program product according to claim 1, wherein the calculating a score further comprises:

rating items from the list of items by the passive friends from the social network;

assigning an item index for each item from the list of items based on ontologies of the passive friends from the social network;

calculating a ratio, for each passive friend from the social network of the user, between the rating and the item index corresponding to each item; and summing the calculated ratios for all the passive friends from the social network of the user to determine the score of the item.

3. A computer-implemented method of determining a list of items on a computer, comprising:

calculating an intimacy score for each passive friend of a user, the intimacy score being determined based upon a determined correspondence in interests;

generating a social network of passive friends of the user based on the intimacy score of each passive friend;

calculating a weighted score for each item from a list of items based on the social network of the user, and based on a generated ontology of the user, the ontology being established based on relationships between the list of items and each passive friend of the user; and presenting the items of the list based on the calculated scores of the items, wherein the calculating the intimacy score further comprises, identifying active friends of the user based upon an interaction history, to determine the passive friends of the user and creating item databases for the user and the passive friends, each data base including a same plurality of categories of characteristics for each item from the list of items, incrementally increasing a value associated with each characteristic of an item (i) in the database for the user when the user selects the characteristic and (ii) in the database for the passive friend when the passive friend selects the characteristic, assigning a weight to each characteristic of an item that is proportional to the value of the characteristic, calculating an index for each characteristic of the item such that the index is a difference between the value of the characteristic for the user and the value of the characteristic for the passive friend, calculating a ratio between the weight for each characteristic of the item and the corresponding index, and summing the calculated ratios for all the characteristics of an item and for all the items from the list of items to determine the intimacy score between the user and each of the passive friends.

4. The computer-implemented method according to claim 3, further comprising:

rating items from the list of items by the passive friends from the social network;

assigning an item index for each item from the list of items based on ontologies of the passive friends from the social network;

calculating a ratio, for each passive friend from the social network of the user, between the rating and the item index corresponding to each item; and summing the calculated ratios for all the passive friends from the social network of the user to determine the score of the item.

* * * * *

UNITED STATES PATENT AND TRADEMARK OFFICE
CERTIFICATE OF CORRECTION

PATENT NO. : 7,689,556 B2  Page 1 of 1
APPLICATION NO. : 11/045115
DATED : March 30, 2010
INVENTOR(S) : Shishir Garg et al.

It is certified that error appears in the above-identified patent and that said Letters Patent is hereby corrected as shown below:

Column 7, line 44, change "110" to --220--

Column 7, line 62, change "110" to --220--

Column 20, line 28, change "for A" to --for the actors A--

Signed and Sealed this

Twenty-second Day of June, 2010

David J. Kappos
*Director of the United States Patent and Trademark Office*